(12) United States Patent
Nagel et al.

(10) Patent No.: US 8,566,247 B1
(45) Date of Patent: Oct. 22, 2013

(54) SYSTEM AND METHOD FOR SECURE COMMUNICATIONS INVOLVING AN INTERMEDIARY

(76) Inventors: Robert H. Nagel, New York, NY (US);
David P. Felsher, Trumbull, CT (US);
Steven M. Hoffberg, West Harrison, NY (US)

( * ) Notice: Subject to any disclaimer, the term of this patent is extended or adjusted under 35 U.S.C. 154(b) by 1486 days.

(21) Appl. No.: 12/031,969

(22) Filed: Feb. 15, 2008

Related U.S. Application Data

(60) Provisional application No. 60/890,498, filed on Feb. 19, 2007.

(51) Int. Cl.
*G06K 21/00* (2006.01)
*H04K 1/00* (2006.01)

(52) U.S. Cl.
USPC ............................... 705/59; 380/30; 380/270

(58) Field of Classification Search
USPC .......................................................... 705/50
See application file for complete search history.

(56) References Cited

U.S. PATENT DOCUMENTS

| | | |
|---|---|---|
| 4,351,982 A | 9/1982 | Miller et al. |
| 4,977,595 A | 12/1990 | Ohta et al. |
| 5,224,162 A | 6/1993 | Okamoto et al. |
| 5,237,159 A | 8/1993 | Stephens et al. |
| 5,315,658 A | 5/1994 | Micali |
| 5,392,353 A | 2/1995 | Morales |
| 5,511,121 A | 4/1996 | Yacobi |
| 5,621,201 A | 4/1997 | Langhans et al. |
| 5,623,547 A | 4/1997 | Jones et al. |
| 5,666,416 A | 9/1997 | Micali |
| 5,677,955 A | 10/1997 | Doggett et al. |
| 5,679,940 A | 10/1997 | Templeton et al. |
| 5,696,908 A | 12/1997 | Muehlberger et al. |
| 5,717,757 A | 2/1998 | Micali |
| 5,754,939 A | 5/1998 | Herz et al. |
| 5,768,385 A | 6/1998 | Simon |
| 5,793,868 A | 8/1998 | Micali |
| 5,799,087 A | 8/1998 | Rosen |
| 5,812,668 A | 9/1998 | Weber |
| 5,815,657 A | 9/1998 | Williams |
| 5,828,840 A | 10/1998 | Cowan et al. |

(Continued)

*Primary Examiner* — Charles C Agwumezie
(74) *Attorney, Agent, or Firm* — Steven M. Hoffberg; Ostrolenk Faber LLP

(57) ABSTRACT

A system and method for communicating information or a cryptographic key therefore between a first party and a second party, comprising the steps of receiving, by an intermediary, an identifier of desired information and accounting information for a transaction involving the information from the first party, transmitting an identifier of the first party to the second party, and negotiating, by the intermediary, a comprehension function for obscuring at least a portion of the information communicated between the first party and the second party. The data transmission may be made secure with respect to the intermediary by providing an asymmetric key or direct key exchange for encryption of the communication between the first and second party. The data transmission may be made secure with respect to the second party by maintaining the information in encrypted format at the second party, with the decryption key held only by the intermediary, and transmitting a secure composite of the decryption key and a new encryption key to the second party for transcoding of the data record, and providing the new decryption key to the first party, so that the information transmitted to the first party can be comprehended by it. According to the present invention, asymmetric key encryption may be employed to provide the establishment of secure communications channels involving an intermediary, without making the intermediary privy to the decryption key or the message.

20 Claims, 10 Drawing Sheets

(56) References Cited

U.S. PATENT DOCUMENTS

| | | | |
|---|---|---|---|
| 5,832,089 A | 11/1998 | Kravitz et al. | |
| 5,839,119 A | 11/1998 | Krsul et al. | |
| 5,850,446 A | 12/1998 | Berger et al. | |
| 5,857,023 A | 1/1999 | Demers et al. | |
| 5,884,277 A | 3/1999 | Khosla | |
| 5,889,862 A | 3/1999 | Ohta et al. | |
| 5,889,863 A | 3/1999 | Weber | |
| 5,898,154 A | 4/1999 | Rosen | |
| 5,901,229 A | 5/1999 | Fujisaki et al. | |
| 5,903,651 A | 5/1999 | Kocher | |
| 5,903,880 A | 5/1999 | Biffar | |
| 5,915,093 A | 6/1999 | Berlin et al. | |
| 5,920,629 A | 7/1999 | Rosen | |
| 5,926,548 A | 7/1999 | Okamoto | |
| 5,930,777 A | 7/1999 | Barber | |
| 5,933,498 A | 8/1999 | Schneck et al. | |
| 5,937,394 A | 8/1999 | Wong et al. | |
| 5,943,424 A | 8/1999 | Berger et al. | |
| 5,949,045 A | 9/1999 | Ezawa et al. | |
| 5,952,638 A | 9/1999 | Demers et al. | |
| 5,960,083 A | 9/1999 | Micali | |
| 5,963,648 A | 10/1999 | Rosen | |
| 5,963,924 A | 10/1999 | Williams et al. | |
| 5,978,840 A | 11/1999 | Nguyen et al. | |
| 5,983,208 A | 11/1999 | Haller et al. | |
| 5,987,132 A | 11/1999 | Rowney | |
| 5,987,140 A | 11/1999 | Rowney et al. | |
| 5,996,076 A | 11/1999 | Rowney et al. | |
| 5,999,919 A | 12/1999 | Jarecki et al. | |
| 6,002,767 A | 12/1999 | Kramer | |
| 6,003,765 A | 12/1999 | Okamoto | |
| 6,016,484 A | 1/2000 | Williams et al. | |
| 6,018,724 A | 1/2000 | Arent | |
| 6,021,202 A | 2/2000 | Anderson et al. | |
| 6,021,399 A | 2/2000 | Demers et al. | |
| 6,026,163 A | 2/2000 | Micali | |
| 6,026,379 A | 2/2000 | Haller et al. | |
| 6,029,150 A | 2/2000 | Kravitz | |
| 6,029,151 A | 2/2000 | Nikander | |
| 6,035,402 A | 3/2000 | Vaeth et al. | |
| 6,047,067 A | 4/2000 | Rosen | |
| 6,047,887 A | 4/2000 | Rosen | |
| 6,049,786 A | 4/2000 | Smorodinsky | |
| 6,049,787 A | 4/2000 | Takahashi et al. | |
| 6,055,508 A | 4/2000 | Naor et al. | |
| 6,057,872 A | 5/2000 | Candelore | |
| 6,058,381 A | 5/2000 | Nelson | |
| 6,061,448 A | 5/2000 | Smith et al. | |
| 6,061,665 A | 5/2000 | Bahreman | |
| 6,065,675 A | 5/2000 | Teicher | |
| 6,072,870 A | 6/2000 | Nguyen et al. | |
| 6,192,472 B1 | 2/2001 | Garay et al. | |
| 6,199,052 B1 * | 3/2001 | Mitty et al. | 705/75 |
| 6,587,946 B1 | 7/2003 | Jakobsson | |
| 6,687,822 B1 | 2/2004 | Jakobsson | |
| 6,779,111 B1 | 8/2004 | Gehrmann et al. | |
| 6,859,533 B1 | 2/2005 | Wang | |
| 6,937,726 B1 * | 8/2005 | Wang | 380/30 |
| 7,143,284 B2 | 11/2006 | Wheeler et al. | 713/155 |
| 7,181,017 B1 * | 2/2007 | Nagel et al. | 380/282 |
| 2002/0073202 A1 | 6/2002 | Wang | |
| 2003/0235308 A1 * | 12/2003 | Boynton et al. | 380/270 |
| 2006/0136717 A1 * | 6/2006 | Buer et al. | 713/155 |

* cited by examiner

SYSTEM AND METHOD FOR SECURE COMMUNICATIONS INVOLVING AN INTERMEDIARY

FIELD OF THE INVENTION

The present invention relates to the field of secure communications of private and/or proprietary information, such as trade secret, media, secret medical records, or security information and more particularly to multiparty communications supporting transactional accounting.

BACKGROUND OF THE INVENTION

Computer and information system security is currently an important issue. With the proliferation of computers and computer networks into all aspects of business and daily life—financial, medical, education, government, and communications—the concern over secure file access and communications privacy is growing.

The liability or risks involved in holding or communicating private information can well exceed the value of the storage or communications services. Therefore, even in the case of a trusted party, indemnification or insurance may be inefficient or insufficient means for addressing these risks or liabilities. Rather, where considerable risk or liability arises from unauthorized disclosure of the information, the storage or communication of the information must involve an efficient scheme that will minimize the risk of disclosure. Therefore, an intermediary in a transaction preferably handles only encrypted data, and need not be trusted to maintain the privacy of the underlying message. While two-party encryption is well known, schemes are not well developed for providing third party involvement, wherein the third party plays a requisite role in the transaction but which need not or is not trusted with access to the information or the cryptographic key.

A number of communications systems and methods are known for dealing with three-party communications, for example, where a third party provides ancillary services to support the communications, such as authentication, accounting, and key recovery. Often, the nature of these communications protocols places the third party (or group of third parties) in a position of trust, meaning that the third party or parties, without access to additional information, can gain access to private communications or otherwise undermine transactional security or privacy.

Transactions for which third party support may be appropriate include distribution of private medical records, communication of digital content, and anonymous proxy services.

Another aspect of three party communications is that it becomes possible for two (or more) parties to hold portions of a secret or a key to obtain the secret, without any one party alone being able to access the secret. For example, Silvio Micali has developed a mature Fair Encryption scheme in which a number of trustees collaborate to hold portions of a key used to secure privacy of a communication between two principals, but who must act together to gain access to the secret. In Micali's Fair Encryption scheme, however, cooperation of neither of the principal parties to a communication is required in order to access the secret. The third party trustees, as a group, are trusted with a secret. The basis for this trust is an issue of factual investigation. The Micali Fair Encryption scheme does, however, provide a basis for the generation and use of composite asymmetric encryption keys. See, Eyal Kushilevitz, Silvio Micali & Rafael Ostrovsky, "Reducibility and Completeness in Multi-Party Private Computations", Proc. of 35th FOCS, pp. 478-489, 1994, expressly incorporated herein by reference.

The Micali Fair Encryption scheme does not, however, allow communication of a secret in which only one party gains access to the content, and in which the third party or parties and one principal operate only on encrypted or secret information. This system is discussed in further detail below.

See: S. Micali. Fair Public-Key Cryptosystems. Advances in Cryptology—Proceedings of CRYPTO'92 (E. F. Brickell, ed.) Lecture Notes in Computer Science 740, SpringerVerlag (1993) pages 113-138; S Micali, Fair cryptosystems, MIT Technical Report, MIT/LCS/TR-579, November 1993, MIT Laboratory for Computer Science, November 1993.

See also, N. Gilboa, "Two Party RSA Key Generation", Proc of Crypto '99, Lecture Notes in Computer Science, Vol. 1666, Springer-Verlag, pp. 116-129, 1999; D. Boneh, J. Horwitz, "Generating a product of three primes with an unknown factorization", Proc. of the third Algorithmic Number Theory Symposium (ANTS), 1998, pp. 237-251; Lin, Cun-Li, Sun, Hung-Min, and Hwang, Tzonelih, "Three Party Key Exchange: Attacks and a Solution".

Electronic Medical Records

In the field of medical care, accuracy of collected data is of significant importance. Erroneous data, whether collected manually or automatically, presents the possibility of an erroneous diagnosis or treatment. Prior accumulated data about the patient may be relevant to future diagnosis and treatment. Therefore, preservation and availability of accurate medical records remains an important part of the modern health care system.

The art of medical record keeping has developed over centuries of medical practice to provide an accurate account of a patient's medical history. Record keeping in medical practice was developed to help physicians, and other healthcare providers, track and link individual "occurrences" between a patient and a healthcare provider. Each physician/patient encounter may result in a record including notes on the purpose of the visit, the results of physician's examination of the patient, and a record of any drugs prescribed by the physician. If, for example, the patient were referred to another clinic for additional testing, such as a blood analysis, this would form a separate medical encounter, which would also generate information for the medical record.

Over the years, paper medical records have evolved from individual practitioners' informal journals to the current multi-author, medical/legal documents. These paper records serve as the information system on which modern medical practice is based. While the paper-based medical record system has functioned well over many decades of use, it has several shortcomings. First, while a paper-based record system can adequately support individual patient-physician encounters, it is cumbersome to use as a source of pooled data for large-scale analysis. While the medical data in the paper-based records is substantial, the ability to adequately index, store and retrieve information from the paper-based mechanisms prevents efficient analysis of the data. Thus, paper medical records could be a rich source of information for generating new knowledge about patient care, if the data could be accessed on a large scale. Second, each portion of the paper-based record is generated and kept at the site of the medical service. Hence, the total record is fragmented among many sites. Consequently, access by off-site physicians is less than optimal. The inability to access a complete medical record in a short period of time presents problems both for individual care and group care of patients. Thus, electronic medical records (EMRs) have been developed to facilitate storage, retrieval, communication and use of the valuable patient medical history information, both for the particular patient and for studies of patient populations.

While there have been attempts to develop computer database architectures capable of storing and retrieving medical record information which reconcile physicians' desires for maintaining a format of unstructured medical information with database requirements for highly structured data storage, these systems provide an inadequate infrastructure for the efficient transmission, use and security protection of the data.

Medical information poses significant challenges to knowledge management systems. Medical information presently includes file types including various media types, including numeric data, text, scanned text images, scanned graphic images, sound (e.g., phonocardiography and dictation), high resolution images (radiology) and video (ultrasonic imaging and fluoroscopy). The medical records for an individual may, over time, grow to multiple megabytes or even gigabytes of data, and advanced medical techniques promise to increase the volume of patient data. These records come from a number of different medical service providers, and may be stored in geographically disparate locations. Often, a new medical service provider will seek to review all appropriate previous medical records for a patient. Further, in third party reimbursement situations, the third party payor will seek to review records in connection with billed services. These various data types and associated information storage systems are not standardized, impeding efficiency of sharing and communicating the data.

Medical records often include data that is intensely personal, such as sexual habits, drug abuse, psychological disorders, family histories, genetics, terminal diseases, injuries, and the like. This personal information is revealed to, or generated by, treating medical professionals in an environment that presumes an absolute privilege held by the patient. The adoption of electronic medical record systems should not impair this presumption. Thus, while there are legitimate reasons for transmitting medical information files, such transmission must be secure, limited to appropriate circumstances and to authorized recipients.

Indeed, while the private medical information technically cannot be disclosed without the consent of the patient, since at least the time of Hippocrates, the medical institutions that hold this information guard it jealously. Thus, privacy considerations may make it difficult to obtain collaboration between medical institutions in the ongoing treatment of a patient. While there are important legitimate uses for medical data, there is also a substantial possibility for abuse of the data and the associated trust relationship between patient and medical care provider represented therein. Presently, laws and regulations have been promulgated (but not yet effective) regulating electronic medical records.

The U.S. Supreme Court has reaffirmed that the expectation of privacy of medical data is necessary in order to ensure that patients are not deterred from seeking needed medical care. Disclosure of medical information to non-medical personnel without patient consent was a primary concern of the Court in Ferguson v. City of Charleston, 532 U.S. 67 (2001).

Typically, in a hospital medical information system, information relating to patients in a database is generated and used by users having a variety of roles, including doctors and medical professionals of various specialties, nurses, therapists of various types, paraprofessionals, social workers, clinical laboratories, and bedside devices (which may automatically generate or receive patient information). In addition, medical information is used, but typically not generated by, pharmacies, administrators, lawyers, insurers or payors, and other parties. Because of the many types of caregivers and other data users, the idea of role-based access is appropriate; basically, medical professionals of different types will require access to various subsets of the medical record. For example, typically the primary care physician and certain consults will require full access, while others may not require full access.

One scheme for increasing the portability of medical records is to provide personal data storage devices, for example in credit card format optical storage medium. These devices, however, present a security risk, since it cannot be presumed that the patient will be able to provide consent to the use of the information when required; thus, access controls should contemplate that scenario. Further, the information carrier can be lost, unavailable or stolen.

Encryption Technologies

Encryption technologies, particularly public key encryption systems, seek to minimize some of these weaknesses by reducing the need to share secrets amongst participants to a secure or private communication. Typical public key encryption technologies, however, presume that a pair of communications partners seek to communicate directly between each other, without the optional or mandatory participation of a third party, and, in fact, are designed specifically to exclude third party monitoring. Third parties, however, may offer valuable services to the participants in a communication, but existing protocols for involvement of more than two parties are either inefficient or insecure.

Traditional encryption algorithm schemes rely on use of one or more finite keys which are provided to an algorithm which generates a data string which is apparently random, called pseudorandom, but which can be predicted based on a knowledge of both the algorithm and the key(s), allowing extraction of a superimposed data message. Optimality of an algorithm for a given set of circumstances is based on a number of factors, and therefore many different cryptographic schemes coexist. Essentially, the key should be sufficiently long and stochastic that an extraordinarily long period of time would be necessary to attempt a brute force attack on the algorithm, while only a reasonable amount of time is required to generate keys, encrypt and decrypt messages. In addition, the key should be sufficiently long that observation of pseudorandom (encrypted) datastreams does not permit one to determine the key to the algorithm.

Public Key Encryption is a concept wherein two keys are provided. The keys form a pair, such that a message encrypted with one key of the pair may be decrypted only by the corresponding key, but knowledge of the public key does not impart effective knowledge of the private key. Typically, one of the keys is made public, while the other remains secret, allowing use for both secure communications and authentication. Communications may include use of multiple key pairs, to provide bilateral security. The public key pair may be self-generated, and therefore a user need not transmit the private key. It must, however, be stored.

The basis for Diffie Hellman and RSA-type public key encryption methods is the large disparity in computational complexity between decrypting the public key created cipher text with the public key encryption private key, which is very rapid and simple to do, and working through the possibilities without the key, which takes a very long time through all known means.

Modern public-key data encryption was originally suggested by Diffie and Hellman, "New Directions In Cryptography," I.E.E.E. Transactions on Information Theory (November 1976) (the disclosure of which is hereby incorporated by reference), and was further developed by Ronald L. Rivest, Adi Shamir, and Leonard M. Adleman: "A Method for Obtaining Digital Signatures and Public-Key Cryptosystems," Communications of the ACM 21(2):120-126 (February 1978) (the disclosure of which is hereby incorporated by reference). See also, U.S. Pat. No. 4,351,982, expressly incorporated herein by reference.

The basic reason for public-key encryption system is to ensure both the security of the information transferred along a data line, and to guarantee the identity of the transmitter and to ensure the inability of a receiver to "forge" a transmission as being one from a subscriber on the data line. Both of these desired results can be accomplished with public-key data encryption without the need to maintain a list of secret keys specific to each subscriber on the data line, and without requiring the periodic physical delivery or the secure electronic transmission of secret keys to the various subscribers on the data line.

According to the Diffie Hellman scheme, two hosts can create and share a secret key without ever communicating the key. Each host receives the "Diffie-Hellman parameters". A prime number, 'p' (larger than 2) and "base", 'g', an integer that is smaller than 'p'. The hosts each secretly generate their own private number, called 'x', which is less than "p−1". The hosts next generate a respective public key, 'y'. They are created with the function: y=g$^x$ Mod p. The two hosts now exchange their respective public keys ('y') and the exchanged numbers are converted into a secret key, 'z' by the following function: z=y$^x$ Mod p. 'z' can now be used as an encryption key in a symmetric encryption scheme. Mathematically, the two hosts should have generated the same value for 'z', since according to mathematical identity theory, $$z = (g^x \bmod p)^{x'} \bmod p = (g^{x'} \bmod p)^x \bmod p.$$

A method of public-key encryption developed by Rivest, Shamir & Adelman, and now generally referred to as RSA, is based upon the use of two extremely large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques within an acceptably long period of time. This is due to the fact that for a composite number composed of the product of two very large prime numbers, the computational time necessary to factor this composite number is unacceptably long. A brute force attack requires a sequence of putative keys to be tested to determine which, if any, is appropriate. Therefore a brute force attack requires a very large number of iterations. The number of iterations increases geometrically with the key bit size, while the normal decryption generally suffers only an arithmetic-type increase in computational complexity.

In the RSA encryption algorithm, the message (represented by a number M) is multiplied by itself (e) times (called "raising (M) to the power (e)"), and the product is then divided by a modulus (n), leaving the remainder as a ciphertext (C): $C=M^e \bmod n$. In the decryption operation, a different exponent, (d) is used to convert the ciphertext back into the plain text: $M=C^d \bmod n$. The modulus (n) is a composite number, constructed by multiplying two prime numbers, (p) and (q), together: n=p*q. The encryption and decryption exponents, (d) and (e), are related to each other and the modulus (n) in the following way: $d=e^{-1} \bmod((p-1)(q-1))$, or equivalently, $d*e=1 \bmod((p-1)(q-1))$. The RSA ciphertext is thus represented by the expression $C=M^e \bmod n$. The associated decryption function is $M=C^d \bmod n$. Therefore, $M=C^d \bmod n = (M^e \bmod n)^d \bmod n$, indicating that the original message, encrypted with one key, is retrieved as plain text using the other key. To calculate the decryption key, one must know the numbers (p) and (q) (called the factors) used to calculate the modulus (n).

The RSA Algorithm may be divided, then, into three steps:
(1) key generation: in which the factors of the modulus (n) (the prime numbers (p) and (q)) are chosen and multiplied together to form (n), an encryption exponent (e) is chosen, and the decryption exponent (d) is calculated using (e), (p), and (q).

(2) encryption: in which the message (M) is raised to the power (e), and then reduced modulo (n).

(3) decryption: in which the ciphertext (C) is raised to the power (d), and then reduced modulo (n).

Micali, U.S. Pat. Nos. 6,026,163 and 5,315,658, expressly incorporated herein by reference, teach a number of split key or so-called fair cryptosystems designed to allow a secret key to be distributed to a plurality of trusted entities, such that the encrypted message is protected unless the key portions are divulged by all of the trusted entities. Thus, a secret key may be recovered, through cooperation of a plurality of parties. These methods were applied in three particular fields; law enforcement, business auctions, and financial transactions.

Essentially, the Micali systems provide that the decryption key is split between a number (n) of trusted entities, meeting the following functional criteria: (1) The private key can be reconstructed given knowledge of all n of the pieces held by the plurality of trusted entities; (2) The private key cannot be guessed at all if one only knows less than all (<n−1) of the special pieces; and (3) For i−1, ... n, the i$^{th}$ special piece can be individually verified to be correct. The special pieces are defined by a simple public algorithm which itself exploits the difficulty in factoring large numbers as a basis for asymmetric security.

Micropayments

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs. Often, a micropayment involves a cryptographic function which provides a portable, self-authenticating cryptographic data structure, and may involve asymmetric cryptography. As will be clear from the discussion below, such characteristics may permit micropayments to be integrated as a component of the present invention, or permit aspects of the invention to operate as micropayments.

The following U.S. Patents, expressly incorporated herein by reference, define aspects of micropayment, digital certificate, and on-line payment systems: U.S. Pat. No. 5,999,919 (Jarecki, et al., Dec. 7, 1999), U.S. Pat. No. 5,930,777 (Barber, Jul. 27, 1999, Method of charging for pay-per-access information over a network); U.S. Pat. No. 5,857,023 (Jan. 5, 1999, Demers et al., Space efficient method of redeeming electronic payments); U.S. Pat. No. 5,815,657 (Sep. 29, 1998, Williams, System, method and article of manufacture for network electronic authorization utilizing an authorization instrument); U.S. Pat. No. 5,793,868 (Aug. 11, 1998, Micali, Certificate revocation system), U.S. Pat. No. 5,717,757 (Feb. 10, 1998, Micali, Certificate issue lists); U.S. Pat. No. 5,666,416 (Sep. 9, 1997, Micali, Certificate revocation system); U.S. Pat. No. 5,677,955 (Doggett et al., Electronic funds transfer instruments); U.S. Pat. No. 5,839,119 (Nov. 17, 1998, Krsul; et al., Method of electronic payments that prevents double-spending); U.S. Pat. No. 5,915,093 (Berlin et al.); U.S. Pat. No. 5,937,394 (Wong, et al.); U.S. Pat. No. 5,933,498 (Schneck et al.); U.S. Pat. No. 5,903,880 (Biffar); U.S. Pat. No. 5,903,651 (Kocher); U.S. Pat. No. 5,884,277 (Khosla); U.S. Pat. No. 5,960,083 (Sep. 28, 1999, Micali, Certificate revocation system); U.S. Pat. No. 5,963,924 (Oct. 5, 1999, Williams et al., System, method and article of manufacture for the use of payment instrument holders and payment instruments in network electronic commerce); U.S. Pat. No. 5,996,076 (Rowney et al., System, method and article of manufacture for secure digital certification of electronic commerce); U.S. Pat. No. 6,016,484 (Jan. 18, 2000, Williams et al., System, method and article of manufacture for network electronic payment instrument and certification of payment and credit collection utilizing a payment); U.S. Pat. No. 6,018,724 (Arent); U.S. Pat. No. 6,021,202 (Anderson et al., Method and system for processing electronic documents); U.S. Pat. No. 6,035,402 (Vaeth et al.); U.S. Pat. No. 6,049,786 (Smorodinsky); U.S. Pat. No. 6,049,787 (Takahashi, et al.); U.S. Pat. No. 6,058,381 (Nelson, Many-to-many payments system for network content materials); U.S. Pat. No. 6,061,448 (Smith, et al.); U.S. Pat. No. 5,987,132 (Nov. 16, 1999, Rowney, System, method and article of manufacture for conditionally accepting a payment method utilizing an extensible, flexible architecture); U.S. Pat. No. 6,057,872 (Candelore); and U.S. Pat. No. 6,061,665 (May 9, 2000, Bahreman, System, method and article of manufacture for dynamic negotiation of a network payment framework). See also, Rivest and Shamir, "PayWord and MicroMint: Two Simple Micropayment Schemes" (May 7, 1996); Micro PAYMENT transfer Protocol (MPTP) Version 0.1 (22 Nov. 95) et seq., http://www.w3.org/pub/WWW/TR/WD-mptp; Common Markup for web Micropayment Systems, http://www.w3.org/TR/WD-Micropayment-Markup (9 Jun. 99); "Distributing Intellectual Property: a Model of Microtransaction Based Upon Metadata and Digital Signatures", Olivia, Maurizio, http://olivia.modlang.denison.edu/~olivia/RFC/09/, all of which are expressly incorporated herein by reference.

See, also: U.S. Pat. No. 4,977,595 (Dec. 11, 1990, Method and apparatus for implementing electronic cash); U.S. Pat. No. 5,224,162 (Jun. 29, 1993, Electronic cash system); U.S. Pat. No. 5,237,159 (Aug. 17, 1993, Electronic check presentment system); U.S. Pat. No. 5,392,353 (February 1995, Morales, TV Answer, Inc. Interactive satellite broadcast network); U.S. Pat. No. 5,511,121 (Apr. 23, 1996, Efficient electronic money); U.S. Pat. No. 5,621,201 (April 1997, Langhans et al., Visa International Automated purchasing control system); U.S. Pat. No. 5,623,547 (Apr. 22, 1997, Value transfer system); U.S. Pat. No. 5,679,940 (October 1997, Templeton et al., TeleCheck International, Inc. Transaction system with on/off line risk assessment); U.S. Pat. No. 5,696,908 (December 1997, Muehlberger et al., Southeast Phonecard, Inc. Telephone debit card dispenser and method); U.S. Pat. No. 5,754,939 (May 1998, Herz et al., System for generation of user profiles for a system for customized electronic identification of desirable objects); U.S. Pat. No. 5,768,385 (Jun. 16, 1998, Untraceable electronic cash); U.S. Pat. No. 5,799,087 (Aug. 25, 1998, Electronic-monetary system); U.S. Pat. No. 5,812,668 (Sep. 22, 1998, System, method and article of manufacture for verifying the operation of a remote transaction clearance system utilizing a multichannel, extensible, flexible architecture); U.S. Pat. No. 5,828,840 (Oct. 27, 1998, Server for starting client application on client if client is network terminal and initiating client application on server if client is non network terminal); U.S. Pat. No. 5,832,089 (Nov. 3, 1998, Off-line compatible electronic cash method and system); U.S. Pat. No. 5,850,446 (Dec. 15, 1998, System, method and article of manufacture for virtual point of sale processing utilizing an extensible, flexible architecture); U.S. Pat. No. 5,889,862 (Mar. 30, 1999, Method and apparatus for implementing traceable electronic cash); U.S. Pat. No. 5,889,863 (Mar. 30, 1999, System, method and article of manufacture for remote virtual point of sale processing utilizing a multichannel, extensible, flexible architecture); U.S. Pat. No. 5,898,154 (Apr. 27, 1999, System and method for updating security information in a time-based electronic monetary system); U.S. Pat. No. 5,901,229 (May 4, 1999, Electronic cash implementing method using a trustee); U.S. Pat. No. 5,920,629 (Jul. 6, 1999, Electronic-monetary system); U.S. Pat. No. 5,926,548 (Jul. 20, 1999, Method and apparatus for implementing hierarchical electronic cash); U.S. Pat. No. 5,943,424 (Aug. 24, 1999, System, method and article of manufacture for processing a plurality of transactions from a single initiation point on a multichannel, extensible, flexible architecture); U.S. Pat. No. 5,949,045 (Sep. 7, 1999, Micro-dynamic simulation of electronic cash transactions); U.S. Pat. No. 5,952,638 (Sep. 14, 1999, Space efficient method of electronic payments); U.S. Pat. No. 5,963,648 (Oct. 5, 1999, Electronic-monetary system); U.S. Pat. No. 5,978,840 (System, method and article of manufacture for a payment gateway system architecture for processing encrypted payment transactions utilizing a multichannel, extensible, flexible architecture); U.S. Pat. No. 5,983,208 (Nov. 9, 1999, System, method and article of manufacture for handling transaction results in a gateway payment architecture utilizing a multichannel, extensible, flexible architecture); U.S. Pat. No. 5,987,140 (Nov. 16, 1999, System, method and article of manufacture for secure network electronic payment and credit collection); U.S. Pat. No. 6,002,767 (Dec. 14, 1999, System, method and article of manufacture for a modular gateway server architecture); U.S. Pat. No. 6,003,765 (Dec. 21, 1999, Electronic cash implementing method with a surveillance institution, and user apparatus and surveillance institution apparatus for implementing the same); U.S. Pat. No. 6,021,399 (Feb. 1, 2000, Space efficient method of verifying electronic payments); U.S. Pat. No. 6,026,379 (Feb. 15, 2000, System, method and article of manufacture for managing transactions in a high availability system); U.S. Pat. No. 6,029,150 (Feb. 22, 2000, Payment and transactions in electronic commerce system); U.S. Pat. No. 6,029,151 (Feb. 22, 2000, Method and system for performing electronic money transactions); U.S. Pat. No. 6,047,067 (Apr. 4, 2000, Electronic-monetary system); U.S. Pat. No. 6,047,887 (Apr. 11, 2000, System and method for connecting money modules); U.S. Pat. No. 6,055,508 (Apr. 25, 2000, Method for secure accounting and auditing on a communications network); U.S. Pat. No. 6,065,675 (May 23, 2000, Processing system and method for a heterogeneous electronic cash environment); U.S. Pat. No. 6,072,870 (Jun. 6, 2000, System, method and article of manufacture for a gateway payment architecture utilizing a multichannel, extensible, flexible architecture), each of which is expressly incorporated herein by reference.

SUMMARY OF THE INVENTION

The present invention provides a system, method and business model for conducting transactions involving private or proprietary information wherein an intermediary performs a requisite function with respect to the transaction without requiring the intermediary to be trusted with respect to the private information or cryptographic keys for communicated information. This system and method employ secure cryptographic schemes, which reduce the risks and liability for unauthorized disclosure of private information, while maintaining efficient and robust transactions.

The system and method according to the present invention provide a basis for a set of business models, in which the third party accounts for secure data transactions, by maintaining a critical logical function in data communication. Thus, during each such transaction, the intermediary may force or require a financial accounting for the transaction. Further, by exerting this control over the critical function outside the direct communication channel, the intermediary maintains a low communication bandwidth requirement and poses little risk of intrusion on the privacy of the secure communication. Further, the intermediary never possesses sufficient information to unilaterally intercept and decrypt the communication.

The present invention also provides a system and method for providing ancillary services with respect to communicating information. These ancillary services encompass, for example, applying a set of rules governing an information communication transaction. For example, the rules limit access based on recipient authentication, define a financial accounting, role or class of an intended recipient, or establish other limits. These services may also include logging communications or assisting in defining communications counter-parties. The access control is implemented by an intermediary to the underlying transaction, which facilitates the transaction by removing the necessity for a direct and contemporaneous communication with the equitable holder of a pertinent right for each transaction. The intermediary maintains a set of rights-associated rules, over which it may hold legal title. The intermediary may serve as a trustee, applying the rules on behalf of the equitable owner of the right. In order to enforce rights-based restrictions, the trustee may hold, associated with the rights information, a key, for example an encryption key, necessary for access or use of the information.

According to the present invention, the intermediary is trusted to implement the rules, but not necessarily trusted with access to, or direct and sole access control over the information. According to a preferred embodiment, the intermediary, acting alone, cannot access or eavesdrop on the private information or a communication stream including the information. Further, in accordance with the Micali split key escrow scheme, the intermediary may be implemented as a set of entities, each holding a portion of a required key.

The present invention also provides enhancements to traditional secure communications by providing involvement of a third party, or intermediary, who need not, and preferably does not, have access to the communicated information, while providing transaction-support services between the two parties involved in the communication. According to a further embodiment of the invention, only one party to the communication is privy to the secured information; the host for transmission of the information does not, as a part of the transaction, access the information itself.

Thus, the system according to the present invention provides a conduit for the authorized transmission of records, such as medical records, while maintaining the security of the records against unauthorized access. A preferred communications network is the Internet, a global interconnected set of public access networks, employing standardized protocols. Thus, the records may be transmitted virtually anywhere on earth using a single infrastructure. Alternately, private networks or virtual private networks may be employed. In fact, as the system according to the present invention gains ubiquity, a private network model would be preferred, in order to increase security and allow the system to be tuned to the types of data and quality of service demands made by users.

An embodiment of the present invention involves the implementation and use of a Virtual Trust, wherein an owner of rights in information entrusts the application of a set of rules and/or limitations, to a Virtual Trustee. The Virtual Trustee implements these rules and/or limitations, unless countermanded. One of the rules and/or limitations may be to seek input from the rights owner, if available. The Virtual Trust may, for example, be established under law as a separate legal entity, subject to jurisdictional law of trusts, and hold legal title over the information and/or the right to access the information.

Publicly accessible secure database systems pose significant security problems. Attempts to achieve high levels of technical invulnerability may lead to practical problems, system weaknesses and security holes. Passwords may be written near access terminals. Security tokens can be stolen or misplaced. Users may share supposedly secret information. Providing an administration capability, typically creates a user class which bypasses normal security protocols. Secure systems may be built on insecure platforms. Therefore, it is desirable to maintain private information in a secure format, without relying on trust or enforcement responsibilities of any third party as a critical component of system security, i.e., third parties do not possess sufficient information to breach the secret, up to a point where it is used by the intended recipient of the information, while facilitating communications between parties who may not have a direct or interactive communication pathway.

Thus, it is well known to exchange a secret password or cryptographic key, or negotiate a secret password or cryptographic key, between two parties. However, these techniques generally require either a direct and interactive communication between parties, or a certificate authority.

Often, when seeking to move secret information through an infrastructure, it is necessary to alter the cryptographic transform between a form accessible for general purpose usage, and a form suitable for specific usage by an intended recipient. For example, a database may be encrypted, but the database system must possess sufficient access privileges to search that database and retrieve results. Further, these privileges typically encompass the entire database, which may include records that have varying security attributes and release criteria. The release of the cryptographic keys employed by the database system would, at least in theory compromise the security of the database as a whole, and therefore as the data is returned from the database server, the cryptographic transform must be changed, so that the keys representing root level access are protected. In some cases, it is desired to search and retrieve data based on metadata, which may differ from an index of the data. That is, the search and retrieval may have limited release of the data being searched. For example, a patient's medical record may be retrieved by patient identifier, without revealing the content of the medical record. In conveying that record to a user, it may be desired to encode the record with a cryptographic transform specific to the intended user, while avoiding release of the basic cryptographic transform keys representing the original storage format.

A type of cryptographic algorithm is known, called "proxy key cryptography", which provides means for converting a cryptographic transform between a first transform associated with a first set of keys, and a second cryptographic transform associated with a second set of keys, without requiring an intermediate decryption of the information. Therefore, for example, such an algorithm could be used to convert the decryption key of a secret record from an original format to a distribution format. See, U.S. Pat. No. 7,181,017 (Nagel et al., issued Feb. 20, 2007, not prior art), U.S. Pat. No. 6,937,726, (Wang, Aug. 30, 2005) and U.S. Pat. No. 6,859,533 (Wang, Feb. 22, 2005), U.S. Pat. No. 6,779,111 (Gehrmann, et al., Aug. 17, 2004), U.S. Pat. No. 6,687,822 (Jakobsson, Feb. 3, 2004), U.S. Pat. No. 6,587,946 (Jakobsson, Jul. 1, 2003), US 20020073202, each of which is expressly incorporated herein by reference in its entirety. See also: Matt Blaze, Martin Strauss, "Atomic Proxy Cryptography", www.research.att.com, AT&T Labs—Research (Feb. 23, 1998); Blaze M.; Bleumer G.; Strauss M.; Nyberg Kaisa, "Divertible protocols and atomic proxy cryptography", EUROCRYPT '98: Advances in Cryptology (Espoo, 31 May-4 Jun. 1998) International Conference On The Theory And Application Of Cryptographic Techniques, Espoo, FINLANDE (31 May 1998); Markus Jakobsson, "On Quorum Controlled Asymmetric Proxy Re-Encryption", and Tatsuaki Okamoto, "Threshold Key-Recovery Systems for RSA"; M. Mambo and E. Okamoto, "Proxy cryptosystems: Delegation of the power to decrypt ciphertexts," IEICE Trans. on Fundamentals, Vol. E80-A, No. 1, pp. 54-63 (1997); Giuseppe Ateniese and Kevin Fu and Matthew Green and Susan Hohenberger, "Improved Proxy Re-Encryption Schemes with Applications to Secure Distributed Storage", Cryptology ePrint Archive, Report 2005/028, Proceedings of NDSS 2005 (journal version to appear in ACM TISSEC) (received 3 Feb. 2005, last revised 11 Jan. 2006). http://eprint.iacr.org/2005/028.pdf; Susan Hohenberger, "Advances in Signatures, Encryption, and E-Cash from Bilinear Groups", (Ph.D. Thesis, MIT, May 2006); Himanshu Khurana, Jin Heo, and Meenal Pant, "From Proxy Encryption Primitives to a Deployable Secure-Mailing-List Solution", To appear in the Eighth International Conference on Information and Communications Security (ICICS '06), Raleigh, N.C., December 2006; J. Basney, P. Flanigan, J. Heo, H. Khurana, J. Muggli, M. Pant, A. Slagell and V. Welch. Mithril: Adaptable Security for Survivability in Collaborative Computing Sites. Workshop on Enterprise Network Security, held in conjunction with SecureComm 2006, Baltimore, Md.; September, 2006; Himanshu Khurana, Adam Slagell, and Rafael Bonilla, SELS: A Secure E-mail List Service, Proc. Security Track ACM Symp. Applied Computing (SAC), March 2005; Himanshu Khurana, Jin Heo, Meenal Pant, "PSELS: Practical Secure Email Lists Services", Securecomm 2006, September 2006, Baltimore, Md.; Himanshu Khurana, SELS: Secure Email List Services, NCSA Private Sector Program Annual Meeting, Urbana, Ill., May 2005; Feng. Bao, Robert. Deng, Jianying. Zhou, Public Key Cryptography—Pkc 2004: 7th International Workshop On Theory And Practice In Public . . . ; Anca Ivan, Yevgeniy Dodis, Proxy Cryptography Revisited, Network and Distributed System Security Symposium Conference Proceedings: 2003; Shuhong Wang and Guilin Wang and Feng Bao and Jie Wang, "Cryptanalysis of a Proxy-protected Proxy Signature Scheme Based on Elliptic Curve Cryptosystem", iteseer.ist.psu.edu/wang02cryptanalysis.html, each of which is expressly incorporated herein by reference.

In typical proxy key systems, a proxy receives a private key from a sender of an asymmetrically encrypted message, and a public key from a recipient of the transformed encrypted message, and computes a transform key (e.g., a product of p and q in an RSA type PKI algorithm) which is applied to the asymmetrically encrypted message. The application of the transform key allows the recipient to use its private key to decrypt the message. As discussed in U.S. Pat. No. 6,937,726, other types of algorithms and cryptographic schemes may also be applied with similar function. In these architectures, the proxy is provided with the decryption key for the original message, and thus is in a position to delegate its right and authority to decrypt the message to the recipient.

On the other hand, the present inventors have proposed that the entity corresponding to the proxy, called an intermediary, may also be deprived of sufficient information to decrypt the message, and therefore be unprivileged. This, in turn, opens potentially different roles for the intermediary than the proxy according to U.S. Pat. No. 6,937,726. For example, medical records are legally privileged, and an entity possessing the ability to decrypt those records has significant potential legal liabilities. On the other hand, an entity which administers the right to decrypt, but does not possess that right itself, may have diminished potential liabilities. In particular, this segregation of administration or rights from possession of rights permits outsourcing of administration, and consolidation of infrastructure.

Another class of problem involves distribution of content separate from a control over access to content. It is well known to distribute content protected by a digital rights management (DRM) system through peer to peer networks or publicly available forums, and then separately control and administer usage through a player or renderer. For example, Microsoft Windows Media Player supports such an architecture. However, this scheme requires that the content be distributed with a single decryption key, which is protected by a "branded" player. The branded player then retrieves a key for the content after authenticating itself to a server, which is stored in a protected key cache. If the security of the player itself becomes compromised, all of the keys in the cache are potentially compromised. Likewise, this scheme limits portability of media between players, which have to separately negotiate licenses, and requires a centralized architecture or direct communications between source and destination. In some cases, each use is monitored, or the duration of usage limited. Since the server provides the keys to the content, it must be privileged to decrypt that content.

In some cases, as noted above, the content to be distributed requires a higher level of security, such that including the rights administrator within the group permitted to access the content would be undesirable. One way to accomplish this is double encryption, with a second key required which is passed from sender to recipient in order to access the content. However, assuming that this second level is secure, it abates the need for any first level encryption, and administration rights may be administered without requiring a cryptographic shell. Likewise, direct negotiation of cryptographic transforms between sender and recipient is sometimes inconvenient, and may indeed itself undesirably leak information, since this permits the sender and recipient to identify each other, which is not otherwise required.

According to one embodiment of the invention, a user provides the intermediary with necessary transactional information relating to private information, in a manner that discloses little or no private information to the intermediary. In like manner, private information may be supplied to a user after the user has supplied necessary transactional information to the intermediary, without in the process disclosing the private information to the intermediary. These techniques may be extended to allow personally identifying information to be removed from a communication by substitution with a non-personally identifying code, supplied by the intermediary. Again, this anonymous process may take place without providing the intermediary with the private information.

In some embodiments, the two principals to the communication remain anonymous with respect to each other, while in other instances, they are known to each other. In the former case, a proxy is provided to avoid divulging the address (e.g., logical or physical address) of the recipient, and, depending on communication protocol, the identity of the sender. The communication channel may remain secure between the two principals, although the proxy becomes trusted with respect to identities of the principals.

The intermediary may, as a matter of course, in the course of its duties, implement a set of rules on behalf of a rights-holder for the information, and indeed communications structures and protocols may be established to force a critical portion of each subject communication to pass through the intermediary.

Different rules may be applied, for example, based on the nature of the information, the role of the recipient, context of the information request, and preferences of a rights-holder of the information.

The proxy cryptography or transcryption techniques provide enhanced opportunities for control and accounting for content or information usage. Content can be readily distributed or transformed into a format specific for an intended recipient. Using a combination of system architecture and controls, as well as adjunct techniques, such as key exchange, complex, multiple level or composite transcryption keys, and Kerberos type techniques, for example, attributes of the transcryption technique may be added to attributes of other techniques, and deficiencies of the various techniques may be remedied.

In a medical embodiment, a patient may, within the scope of available resources, define rules and procedures for access to his or her own medical records. Thus, the rules defined by a patient or record owner may differ from those imposed by the repository medical institution. A default set of rules may be provided which restricts access to medical professionals who can demonstrate authorization, with disclosure of particular transactional records limited according to the requestor's role or other set of rules. As trustee or agent for the patient, the intermediary may also implement more or less restrictive rules as defined by the patient, and release records accordingly. The intermediary may also implement a set of rules defined by the respective custodian medical institution in connection with its own internal processing or communications.

Presently, medical records typically include information that is integral with a physical embodiment. For example radiological records are integrated into film. The original medical record, embodied in its physical manifestation, is "owned" by the originating institution or provider, subject to access control and copying requests by the patient. See, DeWitt et al, "Patient Information and Confidentiality", Treatise on Health Care Law, 16.01 (Kaufman et al., Eds., 1998). However, as electronic medical records gain prominence, and the physical manifestation of the medical records is transformed into information stored in computer storage devices, the medical record may ultimately be treated as property of the patient, subject to retention of a non-distributable (or otherwise subject to limited rights) copy by the originating institution or provider. The present invention therefore provides a system through which a patient may exert various incidents of ownership over the electronic medical record, including access control, copyright, retention, and accounting therefore. According to the present invention, this control may be exercised by providing control over the encryption key(s) for the electronic medical record to an intermediary, who acts under the direction and authority of the patient.

The present invention also encompasses monetary transactions involving the information usage and/or communication. According to one embodiment, digital signatures may be employed in monetary transactions that, after authentication, become anonymous. Thus, according to the present invention, a personally identifying digital signature may be substituted by the intermediary with an anonymous transaction or session identifier. In this case, while the transaction becomes anonymous, it is not necessary for the intermediary to be a direct party to the exchange of value between the principals involved in the communication, and thus the intermediary does not necessarily become privy to the exchange details.

According to the present invention, the security and privacy scheme of the present invention may be employed to convey content to users while ensuring compensation for rights-holders in the content.

According to the present invention, an architecture is provided which allows accounting and implementation of various rules and limits on communications between two parties. Further, an intermediary becomes a necessary part of the negotiation for communication, and thus has opportunity to apply the rules and limits.

Traditionally, medical records maintenance and upkeep have imposed a significant cost and burden. While enterprises have evolved for outsourcing of certain functions, these enterprises have not directly represented the interests of the patient, and rather serve as agents for the medical record custodian.

According to one embodiment of the present invention, each use of a record may trigger an accounting/audit event, thus allowing finely granular transactional records, which may reduce the risks of security and privacy breach in connection with record transmission. Importantly, the present invention allows usage based financial accounting for the information, imposing a financial burden according to a value and/or consumption of system resources. For example, the cost to a user could be a flat fee, depend on a number of factors, be automatically calculated, or relate to volume of usage.

The accounting may also compensate a target of an electronic message for receipt thereof. Thus, a marketer may seek to send an advertisement to a user. The user may then compel the marketer to send the electronic message through an intermediary, providing compensation to the user.

In establishing a secure communications session between the user and the intermediary, it may be useful in some circumstances to employ a challenge-response authentication scheme, for example by passing messages back and forth between the user and the intermediary, the user and the data repository, or the data repository and the intermediary.

According to the present invention, the user's "role" may be checked for consistency with a set of role-based usage rules. The reported role may be accepted, or verified with resort to an authentication database. Based on the role of the user and the identification of the content, the authority of the user to receive records may be determined.

In one embodiment, a user is required to identify the specific records sought, and therefore the authorization matrix representing correspondence of record content and user role may be associated with each record, and may be verified by the data repository as a part of a local authentication process prior to transmitting any portion of a record. Thus, the matrix may represent a metadata format describing the content of the record and the level or type of authority of the user to access that record. This metadata may, of course, itself be privileged information.

In the event that the distribution of metadata or its application at a site is impermissible, a separate metadata processing facility may be provided. This facility may process the metadata in an anonymous index format, thus reducing or eliminating the risks of a privacy or security breach. The user authority matrix may be protected using the composite session key format according to the present invention, and therefore made secure even from the intermediary, which, in this case, may communicate the authority matrix and transactional request details to the metadata processing facility using a composite of a user session key and a metadata session key. The results of the authorization may be transmitted directly from the metadata processing facility directly to the data repository, in the form of a prefiltered specific record request. The intermediary may account for the transaction either on a request-made basis or subscription basis, or communicate accounting information with the data repository, for example to properly exchange required keys and complete the transaction.

The record indices may thus be maintained by entities privy to private information, with results returned to the user, without requiring any disclosure to the intermediary, or maintained by entities insulated from an association between a complete identification of the metadata and the content thereof. Preferably, the index entry for a record includes an identification of the location of the content record and a set of access rules, which are, for example, role based. Alternately, the intermediary may maintain the index locally and apply the respective rules.

The role-based access rules are generally defined automatically, and may be based on contextual and circumstantial data. Manual rules and edits may also be supported. Typically, a hierarchy is defined of data sensitivity, with the most sensitive data provided with the highest level of restrictions. Typically, primary care providers have the highest level of access, while paraprofessionals and other support personnel have access to data on a context-dependent requirements basis only. Further, non-professionals may be provided with data on a need-to-know basis only.

Other medical personnel have access to the record based on context and role. For example, a respiratory therapist might require access to pulmonary and central vascular history records, as well as to abstracts of acute medical information, current pharmaceutical information, scheduling (e.g., for inpatient care), and specific notes directed to the therapist, individually or as a part of a treatment group.

Thus, a past history of depression (resolved) in a patient admitted for a kidney stone would likely be communicated only to the primary care physician and psychiatric treating professional, if any. Possibly, this data would be communicated to a pain management professional, if the past history of depression had a pharmacological or drug abuse component. A surgical consultant, however, may be provided with the entire record. This data may also be deemed contextually irrelevant to the acute treatment.

For example, a treating physician, an oncologist, may seek, on behalf of a lung cancer patient, all radiological studies of the chest over the past three months, as well as non-radiological hospitalization records over the past three years and summary notes of other medical or surgical consultations or treatments over three years. The request, as well as a role-based identification of the oncologist, are relayed to the intermediary, which may process this data internally, or relay it to a separate entity for processing. In the latter case, the information may be completely blinded, according to the present invention, from the intermediary. Initially, the instructions of the patient are recalled from a database, to indicate any specific or general restrictions placed on the release of data. An exemplary role-based access authentication would determine that a primary treating oncologist is indeed authorized to receive radiological (chest) and recent hospitalization records. Further, the indices for the medical summary notes could be screened for pertinence criteria. Thus, information relating to a drug abuse rehabilitation center visit might be restricted upon request of the patient to mental health professionals. In this case, such private information could be screened from the oncologist, likely with some indication of the restriction, allowing the oncologist to subsequently request authorization from the patient. If, on the other hand, the requesting professional was a nurse, the indication of restricted information might not appear, since this indication itself might be deemed a disclosure and the apparent need is lower.

In order to provide further security for the records and the use of the system, various techniques are available. For example, dummy content records may be added to the database and index therefore. Any access of these records is presumably based on an attempt for unauthorized access. Thus, the existence of these records, with access tracking, allows detection of some unauthorized uses of the system. Another method of securing the system is the use of steganographic techniques, for example embedding watermarks in audio and images, pseudorandom dot patterns in scanned page images, random insertion of spaces between words, formatting information, or the like, in text records. Therefore, records obtained through the system may be identified by their characteristic markings. In fact, every authorized record may be subjected to a different set of markings, allowing a record to be tracked from original authorized access to ultimate disposition. An explicit bar code, watermark or other type of code may also be provided on the document for this purpose. It is noted that such markings cannot be implemented on encrypted data at the point of transmission, and thus this type of security requires access to the raw content. However, this may be implemented at the point of decryption, which may be in a sufficiently secure environment. For example, a secure applet may be provided, employing a securely delivered session key, which processes records to test for existing watermarks and to add or substitute a new watermark. Thus, the present invention provides a system for the decryption and watermarking of data, in a content (or content type)-specific manner. An online handshaking event may occur on decryption, to provide confirmation of the process, and indeed may also authenticate the user of the system during decryption.

According to the present invention, asymmetric key encryption may be employed to provide the establishment of secure communications channels involving an intermediary, without making the intermediary privy to the decryption key or the message. Thus, by transmitting only relatively unprivileged information, such as respective public keys, the information and integrity of the system remains fairly secure.

In order to provide a three party transaction in which the intermediary is a necessary party, the information sought to be transmitted is subjected to a secret comprehension function (e.g., a cryptographic or steganographic function) with the key known only to the intermediary. In establishing the communication channel, the information is transcoded between a first comprehension function and a second comprehension function without ever being publicly available.

Modulo arithmetic is both additive and multiplicative, thus, using the same modulo n:

$$(A^x \bmod n \cdot A^y \bmod n) \bmod n = A^{x+y} \bmod n;$$

$$((A) \bmod n + (B) \bmod n) \bmod n = (A+B) \bmod n.$$

$$((A) \bmod n \cdot (B) \bmod n) \bmod n = (A \cdot B) \bmod n.$$

$$(A^x \bmod n)^y \bmod n = (A^y \bmod n)^x \bmod n = A^{xy} \bmod n$$

A preferred algorithm according to the present invention relies on the multiplicative property of modulo arithmetic; in other words, A mod B*C mod B=(A*C) mod B. However, this property is not "reversible", in that knowledge of (A*C) mod B and either A or C does not yield the other, unless the product A*C is less than B, since the modulo function always limits the operand to be less than the modulus value.

Thus, it is seen that in an RSA scheme, $M=C^d \bmod n=(M^e \bmod n)^d \bmod n$. Therefore, in order to communicate the intermediary private information to the intended recipient, the recipient public key 'e1' and intermediary private key 'd2' are defined using the same modulus n, multiplied, and provided to the sender. At the sender, the ciphertext $C2=M^{e2}$ Mod n, previously encrypted with the intermediary's public key e2, is subjected to the function: $C1=C2^{d2e1} \bmod n=M^{e1}$ m mod n. The recipient may then apply its private key d1 to decrypt the message: $M=C1^{d1} \bmod n$.

It should be understood that the algorithm described herein represents merely a portion of an RSA-type public key infrastructure, and that generally all known techniques for preparing the message, maintaining a public key directory, and the like, may be employed in conjunction therewith, to the extent not inconsistent. Thus, the transcoding algorithm should be considered as a generally interchangeable part of the entire cryptographic system, which may be substituted in various known techniques, to achieve the advantages recited herein. In general, only small changes will be necessary to the systems, for example, accommodating the larger composite key length. It is also particularly noted that there are a number of known barriers to exploits that are advantageously employed to improve and maintain the security of the present system and method.

See, David Chaum, "Blind Signatures for Untraceable Payments", Proceedings of Crypto 82, August 1982, p. 199-203. According to the Chaum scheme, a server assists a user in decrypting a message without releasing its secret key or gaining access to the encrypted message. The user communicates a symmetric function of the ciphertext to the server, which is then processed with the secret key, and the resulting modified ciphertext returned to the user for application of an inverse to the symmetric function. See, U.S. Pat. No. 6,192,472, expressly incorporated herein by reference. This technique, however, requires a communication of the complete message in various encrypted forms to and from the server, a potentially burdensome and inefficient task, and is not adapted to communicate a secret file from a first party to a second party.

According to an embodiment of the present invention, a source privy to the communication employs a public key encryption paradigm to require that for comprehension of an encrypted message, at least two keys are required, with all of the predefined keys being required to decrypt the message, and with no apparent relation between the keys, making prediction of one key part difficult or impossible based on the corresponding other key part(s) and the ciphertext message. Thus, at least three parties must cooperate to transmit a message, the sender, the recipient, and a third party holding a necessary key part. This results in an ability to audit and log communications without giving access to confidential information to the auditor. This also facilitates economic transactions, since the communication of the missing key information provides an opportunity for a mandatory third party accounting.

According to the present invention, the holders of key parts are not equal parties to the transaction. Rather, one party acts as the intended recipient, who must "procure" the remaining private key parts in order to use the information. This procedure allows the entity that transmits the information to be assured that the transmission will be secure, even with respect to a trusted third party, while ensuring that the intended recipient must cooperate with the intended third party. For example, the third party receives a fee or other value for this interaction, and is able to log the identity of the intended recipient and time of the transaction. In many instances, for example access to medical information, this allows a third party to authenticate information requests, apply access rules, and log transactions, on behalf of patients or medical institutions, without itself handling the sensitive information. The health care institution, on the other hand, can achieve compliance with regulations protecting the privacy of medical records while providing portability thereof, without increasing its staff or breaching security protocols. Patients, meanwhile, employ a third party for authenticating requests for medical information, logging access, and implementing various rules and limitations.

Using this scheme, the original ciphertext encryption key and recipient private key need never be disclosed, and thus may each be retained for use over an extended period. The session encryption key, however, will vary with each message.

It is noted that, since the intermediary holds the decryption key for the record, it may, in exceptional circumstances and in cooperation with the repository, decrypt the plaintext message. Therefore, it is seen that, even if a user fails to comply with the required access rules (one of which may be, for example, the express consent of the patient), desired information is not lost, locked or completely unavailable. Rather, the intermediary (or trustee) may be given the discretion to release the records or to request release of the records during an emergency.

The present system thus may be used in a number of areas. For example, it may be used to transmit confidential medical records through a public network. However, while secure transmission is relatively easy to perform using modern computing architectures, the logging and authentication require a substantial infrastructure and overhead to maintain. Many institutions would be quite burdened by supporting such potentially labor intensive and infrastructure intensive obligations. Therefore, the present system allows secure access to an institutional database, with the logging and authentication potentially outsourced, to an intermediary. The outside organization, in this case, implements the required security protocols to assure patient data confidentiality both inside and outside the medical institution. The data repository for the medical information may encompass only encrypted information, and therefore implementing an appropriate communications firewall for controlling public access of the database is facilitated.

A entity may control external access to an institutional database, and typically, this entity is trusted both to fulfill its ministerial obligations and to respect the confidentiality of the information subject to the access. This trusted entity may also control internal access and logging. In like manner, the trusted entity may also perform inter-institutional functions, for example where portions of a patient medical record are housed in various institutions. According to the present invention, the degree of trust required of an intermediary may be less than that required of either a key escrow agent or a repository with complete access to the private information. While the intermediary entity may have access to certain tertiary medical record information, such as the existence of records and identity of those accessing the records, the primary records may remain secret, even with respect to this intermediary entity. The intermediary system may incorporate a directory of patient records, assisting an authorized user in obtaining various records.

It is noted that, while medical records are retained by a custodial institution, the corresponding patient retains important rights therein. Thus, the present system may provide the patient with a key portion, which is also required for access to the records. In this case, since the patient's consent will not always be available in a timely manner when the record is needed, a key escrow or key recovery scheme may be implemented to obtain this key portion. This may be implemented in known manner, but preferably the intermediary is trusted to maintain this information and fulfill this role, since this will make any such recovery transaction more efficient.

In order to increase portability, physical records, especially archives, may be stored physically or logically outside the source institution. Thus, limitations of access and bandwidth imposed by a public network gateway for an institution do not impede information transfer. Authorizations, as distinct from the information sought to be communicated, are verified on-line, and may involve access to the source institution, but typically command substantially lower bandwidth requirements.

Current medical records are subject to at least two important controls exerted by the patient: The patient can restrict access to the record, and the patient may demand access and a copy of the record. These two rights, together very much define a type of property interest. Since the intermediary acts as a gatekeeper to the records, it may also act as an agent or trustee for the patient, exercising access rules and the like, by way of the required keys. Thus, it may be considered that the key(s) and possibly other data are held by the intermediary is held in trust for the benefit of patient. The intermediary may adopt a business model either directed to serving the needs of the medical institution(s), the patients, or both.

The trust model for the access privileges allows the trustee the legal authority to act on behalf of the beneficiary (in accordance with the authority granted at the time the trust was created or in effect at the time of the access request). In the case of medical records the beneficiary is the patient. Further, the trust model creates a framework in which courts may provide guidance and/or mandate to a trustee. Thus, in contrast to a typical contractual relationship, the trustee of the access rights to the medical records stands in a different position than a mere party to a contract.

In alliance with this trust model, the intermediary is in a unique position to act as a health care proxy and an executor of a living will for patients. In this model, the patient provides a living will or other instructions to the intermediary. When the patient is unavailable and a decision must be made, the intermediary can search its database for a most current instruction or rule authorized by the patient, and provide an authenticated communication to the health care provider communicating the patient's wishes. For this service, the intermediary may charge a fee, for example a yearly maintenance fee, a per transaction fee, and/or statutory or court-awarded fees.

A potentially significant use of existing medical records is in conjunction with a data mining system. This is because it is generally considered quite expensive to capture medical records, remove patient-specific identification, and place the resulting anonymous records in a database. On the other hand, as the use of electronic medical records and intelligent means for extracting anonymous data from medical records grows, this data will become more accessible. The present system provides an infrastructure for amassing, maintaining and exploiting the value of this data. Thus, by filtering data, obtaining filtered data, or hosting an index to anonymous data, the present intermediary provides a resource to facilitate use of medical data. For example, third party payors may seek to determine the standard of care or best practices for a given patient, in the context of authorization of payment for a procedure. Likewise, a health care professional may seek to determine a patient prognosis. By providing an accessible system that links data for a specific patient, with anonymous data for a plurality of patients with potentially similar medical issues, significant efficiencies may result. Such a system including anonymous data could be established separately from the private medical record database system. The intermediary system according to the present invention may provide authentication and accounting for the use of such anonymous data, as well.

The intermediary may receive fees from or be compensated by the user, by the data repository (e.g., the medical institution or provider), by the patient, or by a third party payor (e.g., an insurance company, health maintenance organization, government entity, etc.) or a combination or subcombination thereof. The intermediary may therefore negotiate with various parties in order to permit access by those parties to the database.

Another application for the intermediary system for distributing the encryption key lies in the entertainment industry. In particular, many forms of entertainment, including music, videos, and the like, involve massive data files, ranging from about 500 kB to multiple gigabytes of data. One solution proposed for the delivery of such data streams is called a peer-to-peer architecture, wherein the hosting of information is distributed over the population of users of the information. Thus, any user seeking information can communicate with another user (or a set of users) seeking to transfer the information. Since the Internet provides a highly redundant and distributed communications network, the capacity of the network is large and the incremental cost of adding a new work to the distributed database is low.

However, typically, the owners of entertainment works seek to maintain control over use of the works and seek to receive compensation for their transfer and/or use. Therefore, the present system allows the work to be locked or encrypted, wherein the owner of the work or its agent serves as a required third party to the communication, and provides the recipient with a dedicated decryption key for use of the work upon accounting therefore. Thus, the recipient is not dependent on a single connection to a host server to obtain the work, and the owner of the work need not invest in maintaining massive file server. This reduces the transaction and infrastructure costs to the owner, which are generally a high percentage of the overall costs in the delivery of electronic media programs. The system may also provide compensation to the host (repository) for allowing use of its resources.

The system operates as follows. Each user is provided with a customized application that manages local files. Each local file is registered with an external server. A user seeking to obtain a copy of a file queries the external server to find appropriate copies residing on the network. Either automatically or manually, the requesting user initiates a transfer of the file through a communications link from another "peer" user. This communication is encrypted, so that no eavesdropper can misappropriate the file, and the intended recipient accounts for its receipt. The decryption key is defined such that a portion is dependent on the identity of the recipient, and a portion provided by or on behalf of the owner of the content. This latter key portion is typically provided only after an accounting, such as a payment for the use of the file. The host for the file encrypts the file using a public key or set of public keys for the recipient and owner. These keys, of course, may be the respective trustee keys defined by the Micali Fair Encryption Scheme, or according to another appropriate encryption scheme. The host for the content may be compensated for use of its system, thus encouraging use within the rules of the system, rather than circumventing the system.

According to one embodiment, in order to prevent users from circumventing the system, the user's public key, and/or the owner's key, may also be embedded as part of a watermark or embedded signal that must match a user's access system. When the embedded data matches, the system operates normally. In the case of a mismatch, it will not operate. The application software at the host converts the embedded signal between that user's and the new user's. In order to prevent circumvention, each user system may periodically report to the intermediary its own "serial number" and possibly the file usage. A user credit card or other financial guaranty may also be used to automatically compensate for any usage.

The present invention allows for the distribution of data from a repository, which does not require the repository to be trusted with the data. Thus, encrypted data may be transmitted, replicated, and cached to the benefit of an owner of rights in the data, since the data is not usable without an encryption key. Such data may be, for example, consumer media or multimedia works, which advantageously are subject to caching by edge servers for efficient utilization. According to the present invention, and in contrast with prior methods, in order for a data record to be used, a separate accounting and authentication transaction is required, and the data record transmitted to the user is presented in a format that requires a custom-generated cryptographic key. Thus, the data remains secure during archival storage and transmission. In order to limit the ability of an authorized recipient from retransmitting the record data, the data may be "fingerprinted" or watermarked to the user or its computing hardware based on the transcryption operation at the data repository (or remote key handler, if present). This fingerprinting allows either tracking of unauthorized transmission, or preventing the use of the record data on different systems or by different users.

As used herein, the phrase "comprehension functions" encompasses both cryptography and steganography. Thus, secret information is required in each case in order to comprehend certain information. In the former case, the information is scrambled, and must be decrypted, while in the later case, it is hidden, and must be located. It is, of course, possible to combine the techniques and employ hidden and scrambled messages. It is also noted that, in some instances, it is not necessary to apply a comprehension function to all of the information in a message. For example, in the case of medical data, it is often the maintenance of security of personally identifying aspects that is sought. Therefore, often only the personally identifying information needs to be selectively obscured. Likewise, in the case of entertainment media, it is possible to selectively degrade the information by selecting only a portion of the media information to selectively obscure, which makes the resulting information significantly less valuable. By selectively applying such a comprehension function only to a portion of the information, substantial computational resources may be conserved or spared.

According to another embodiment of the invention, the transcryption scheme according to the present invention may be employed to securely communicate cryptographic codes between parties to a communication, for example a symmetric encryption key. For example, the Advanced Encryption Standard (AES) employs the Rijndael algorithm, which may provide highly efficient encryption and decryption. Thus, the asymmetric key encryption may be directed principally toward key exchange.

According to another embodiment of the invention, an encrypted message (ciphertext) is "transcoded" from a first encryption type to a second encryption type, without ever passing through a state where it exists as a plaintext message. Thus, for example, an intermediary to the transaction who negotiates the transaction, need not be privileged to the information transferred during the transaction. In the case of medical records, therefore, this means that the intermediary need not be "trusted" with respect to this information.

A preferred embodiment of the invention provides composite key asymmetric cryptographic algorithms to, among other advantages, avoid revealing a plaintext message during intermediate processing. However, it is also possible to employ symmetric key cryptography, especially since the remote key handler is a privileged environment, and may be provided with sufficient security to abate the risk of message disclosure. Further, in some embodiments, the system risks attendant in releasing both the permanent encryption key along with the ciphertext are insubstantial, and therefore a transcoding or transcryption process is not required. These various embodiments are encompassed by the present invention.

As an example of the algorithm according to the present invention, p=61 and q=53, n=pq=3233.

$(e*d)=1 \mod((p-1)(q-1))$ choosing e1=23 results in d1=407;
choosing e2=101, d2=1421.

Selecting an arbitrary message text 1111, the function $C=M^{e1 d2} \mod n$ results in the equation:

$C(1111)^{23*1421} \mod(3233)=2758 \mod(3233)$.

To invert this encryption with ciphertext 2758, $M=C^{e2 d1} \mod n$, resulting in the equation:

$M=(2758)^{101*407} \mod(3233)=1111$.

Thus, it is seen that a preferred algorithm according to the present invention is operative to encrypt and decrypt the message, with a composite key that is relatively large, and thus difficult to determine the respective factors.

A system embodiment of the invention using the preferred algorithm has three properties of particular relevance: (a) while an intermediary may be a necessary party to the transaction, the protocol does not provide the intermediary with sufficient information to eavesdrop, thus, the intermediary is not trusted with the secret communication; (b) due to the transcryption, the sender of the message may maintain an encrypted repository, and also need not be trusted with the secret communication; and (c) that neither the decryption key for the message, nor the message, is transmitted at any stage in the process in an analytic form. Therefore, the message is provided only to an authorized and actively authenticated recipient.

As disclosed herein, embodiments of the present invention provide various techniques for investing in an intermediate a power of decryption delegation, which may be separate and distinct from a power of access to the information. That is, the present invention proposes an infrastructure for digital rights management of sensitive information in which the hierarchy and rights for permitting access to information is distinct from any affirmative right to access the information. In some cases, this distinction is not critical. For example, where the intermediate is fully trusted or integral with the original rights-holder, this distinction may have limited value. On the other hand, where the information is highly valuable, or sensitive, or otherwise is required to be protected, such as by law or contract, the absence of a mechanism for separating the right to control access from the right of access may limit the ability to outsource, delegate, or employ public infrastructure. On the other hand, without substantially compromising security, the present invention permits such a separation, and may, in various embodiments permit outsourcing, sub-delegation, and use of untrusted and/or unprotected resources.

One basic mechanism for implementing this scheme is transcryption, in some cases using technology known as proxy key encryption, which permits encrypted information to be transformed from a state corresponding to one set of cryptographic keys to a state corresponding to another set of cryptographic keys. The information provided to perform the transcryption need not inherently leak any decryption key, and the transcryption process itself may be integral such that it may be performed under insecure conditions. In its most basic form, an RSA-styled transcryption employs a composite key, such that if one of the composite elements is known, the other can be derived. This leads to a possible collusion of two parties to reveal the data. Of course, in a three party model, the source of the information typically possesses the information, and the recipient of the transcrypted information is typically granted a right to decrypt, so that the collusion itself represents one party passing a right it possesses to another party. On the other hand, if a party seeks to reuse its private key in multiple transactions, or the source and/or destination are not themselves authorized, then this collusion becomes at least theoretically problematic. The present invention therefore provides another layer, wherein a composite key is a function of multiple elements, at least one of which is dynamically generated and intended for single use, such that potential for leakage of persistent secrets is reduced. For example, a second party acting in an intermediary capacity may be provided within the infrastructure. Similarly, there are other techniques to remedy this and other shortcomings of the simplest transcryption implementations, to achieve the desired properties for the system with high efficiency.

A number of fields of endeavor are relevant to the present invention, and exemplary prior art, are incorporated herein by reference to the extent consistent herewith. In addition, this disclosure expressly incorporates U.S. patent application Ser. No. 10/106,138, filed Mar. 25, 2002, now U.S. Pat. No. 7,181,017, in its entirety, as well as the references incorporated therein by reference in their entirety. The references as a whole are intended to provide a skilled artisan with embodiments and variations of elements of the present invention, and the teachings therein may be combined and subcombined in various manners in accordance with the present teachings.

DETAILED DESCRIPTION OF THE PREFERRED EMBODIMENTS

Figure 1:
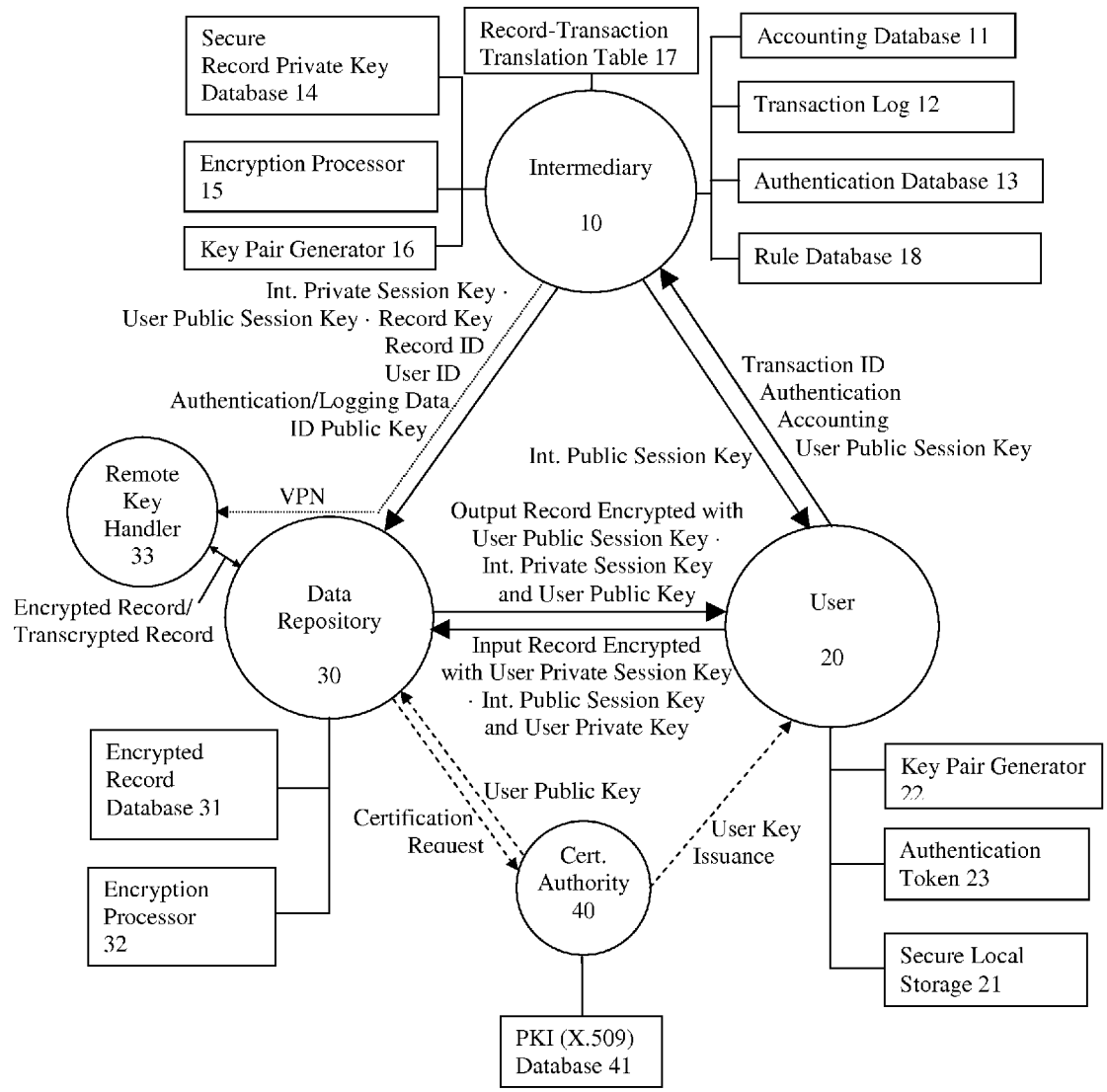
FIG. 1 shows a block diagram of a first embodiment of the communications system according to the present invention.

The present invention provides a transaction scheme involving at least three parties for communication of a message, in which all parties are required, yet only one party, e.g., the intended recipient or user, is trusted with the message. The following identities characterize the known RSA algorithm: $C=M^e \bmod n$ and $M=C^d \bmod n$. For the complete transformation, the relationship is as follows: $M=C^d \bmod n = (M^e)^d \bmod n$. According to the present invention, it is desired to transform ciphertext 1 (C1) into ciphertext 2 (C2), in a secure manner without ever revealing the plaintext message during the process. In order to achieve this transformation from C1 to C2, the process is consolidated. Thus, the decryption according to a first decryption key $M=C1^{d1} \bmod n$ and the reencryption according to a second decryption key $C2=M^{e2} \bmod n$ are combined into a single transcryption operation, $C1^{d1 \cdot e2} \bmod n = M^{e2} \bmod n = C2$. So long as the factors of d1·e2 remain secret, it is infeasible to factor thus number, and thus this transformation inherits the advantages of the RSA encryption scheme. Thus, the plaintext message remains secure through this transformation. In fact, because the transformation is integral, relatively low security is required for the starting and transformed ciphertext, and the crypto-processor itself.

This process also lends itself to three (or more) party transactions, wherein each party is a required participant (maintains secret information necessary for the communication) but only an intended recipient (user) has access to the plaintext message.

Accordingly, if a transaction intermediary supplies a transcoding or transcryption key to the message repository, comprising at least two secret components (so that the composite key may not be factored), an existing ciphertext may be transformed into a new ciphertext. While the components of the composite transcode key are secret, due to the nature of public key systems, these are insufficient for the intermediary to gain access to the message. The two secret components include a key specific for the user, and a key specific for the existing encryption of the message ciphertext. The resulting transformed ciphertext is therefore a public key encrypted message for the user, which can only be decrypted with the user's private key. In order to maintain the security of the original message against subsequent uses, it is preferred that the user's public key-private key pair be a session key, that is, accounted for and used only for the single transmission and subsequently discarded. The "public" portion of the session key pair is transmitted by the user to the intermediary, which is held in secrecy and multiplied by the private key for the existing ciphertext message. In this way, the intermediary has no knowledge of the "private" session key, and cannot itself intercept the communication.

Thus, the data repository handles only encrypted messages according to the present scheme. The decryption key for these messages is held secretly by the intermediary only, and neither released nor transmitted in a form subject to decomposition.

The intermediary, while holding a sufficient decryption key, has no access to the repository ciphertext message, which is separately maintained by the repository.

The user receives a ciphertext message, which is decrypted with a secret key. Typically, the repository will further encrypt the transmission to the user with a permanent-type public key for that user, which will be obtained from or verified by a separate certification authority. Thus, even if the intermediary were to employ a dummy key, the resulting transmission from the repository would still be secure with respect to the intermediary.

In operation, the user generates, on a session basis, a key pair, and provides one portion to the intermediary, the other is maintained in secrecy for the duration of the transaction. The intermediary receives the session key and multiplies it with the secret decryption key for the message held by the data repository. Both the session key and the decryption key individually are held in secrecy by the intermediary. The data repository further receives from the intermediary an identification of the user, which is used to query a certification authority for an appropriate public key. The data repository "transcrypts" the encrypted message with a composite key (resulting from the multiplicative combination of the Record Private Key, the User Public Session Key and the Intermediary Private Session Key) as well as the User (persistent) Public Key to yield a new encrypted message, which is transmitted to the user. The user then applies the retained portion of the session key, as well as its persistent private key, resulting in the original plaintext message. Likewise, the composite encryption key used by the data repository results from the combination of the Record Public Key, Intermediary Private Session Key, and User Public Session Key.

When data is added to the Encrypted Record Database, it may be advantageous to provide the user with a confirmation comprising a hash function performed on the received data, either in its Composite Session Key format (allowing immediate verification by the user) or in its Record Key format (allowing persistent verification of the transaction), or both. Further, it may also be advantageous for the intermediary to receive or act as conduit for these verification communications, allowing an accounting to take place on such confirmation.

When data is communicated from the Encrypted Record Database to a user, it may likewise be advantageous to provide the data repository with a confirmation comprising a hash function performed on data received by the user. This confirmation may advantageously be communicated through the intermediary, allowing an accounting to take place on such confirmation.

Example 1

The transactional details are now described with respect to FIG. 1. While there are three particular parties to the process, the User 20, the Data Repository 30, and the Intermediary 10, a fourth party, a Certification Authority 40 is also generally involved. It is also noted that, while the process shown in FIG. 1 generally provides a communication flow of information from the Data Repository 30 to the User 20, this communication stream may also be reversed, allowing the User 20 to upload information to the Encrypted Database 31 of the Data Repository 30, using a set of User 20 and Intermediary 10 Session Keys and the User 20 Persistent Private Key. At the Remote Key Handler 33, the encrypted message is transcripted with the Record Public Key, securely supplied by the Intermediary 10 through a virtual private network (VPN)-type arrangement, passing through the Data Repository 30.

The User 20 initiates the transaction by contacting the Intermediary 10, which typically maintains an Accounting Database 11, a transaction log 12, an Authentication Database 13, and a Secure Private Key Database 14. The accounting function is typically a financial transaction, wherein the User 20 pays for the information requested. Other forms of accounting are also possible, and indeed, the User 20 may be paid for its review of the information. Particulars of each transaction are typically recorded in the Transaction Log 12, which may be used for auditing, reconciliation, verification, trend analysis, or other purposes. This log potentially allows subsequent aspects of a transaction to be anonymous, with the identifier of the User 20 stripped, while verification of authenticity may continue to be assured through use of an authentication token 23.

The Authentication Database 13 may, for example, provide a means for definitively identifying the User 20, and/or, in the case of a medical record, the identity of the patient who consults the User 20, who is, for example, a health care professional. This identification may be based on a Public Key Infrastructure, biometric identifiers, passwords and/or personal identification numbers (PIN), or other known means. The Intermediary 10 may therefore provide a persistent association of the User 20 and/or a patient in its records, which facilitates accounting, application of rules, recalling of data from a database, etc.

Advantageously, a medical patient may employ a public key to identify himself or herself. This public key is then received by the User 20 as partial evidence of authority and association with the patient. Such keys may expire periodically, preventing persisting use of outdated keys. The Intermediary 10 may then partially authenticate the User 20, by analysis of the patient public key-signed transmission from the User 20 with respect to a patient private key retained by the Intermediary 10. In some implementations of the invention, a patient-specific key pair may be used generally as a Record Encryption Key (e.g., the Record Public Key) for records belonging to that patient in the Encrypted Record Database 31. Generally, this key pair is not identical to the patient key pair used for digital signatures by that patient. It is noted that the Record Public and Private Keys stored in the Secure Record Key Database 14 may, but need not be individually generated for each record added to the Encrypted Record Database 31, and in fact may advantageously be aggregated and a single set of Record Keys used for a single patient or a group of records relating to the same patient, such as a single hospital admission.

The User 20 typically authenticates itself with the Intermediary 10, although in certain instances anonymous or semi-anonymous transactions may be supported. Thus, the Intermediary 10 may serve as a form of proxy to blind transactions while providing security. In the case of medical records, for example, a complete authentication of the User 20 is performed, using any of a variety of means. For example, biometric methods, images, personal identification numbers (PINs) and passwords, alone or in combination with security tokens, such as the SecureID® card, may be employed. The particular level of authentication and the means employed are not a critical aspect of the invention, and therefore the most appropriate means may be selected. Indeed, the Intermediary 10 may support a plurality of authentication schemes, while it may deliver to the Data Repository 30 merely an indication of a successful authentication process.

The Intermediary 10 may impose a set of access rules, stored in the Rule Database 18. These rules, for example, define which Users 20 may access which types of Records.

The Intermediary 10 does not normally hold encrypted information records for two reasons. First, this defeats the three-party security scheme and might compromise the security of the records themselves, and second, this often means replicating and transporting potentially large databases. Rather, the Intermediary 10 provides transactional support for the Data Repository 30, performing a number of tasks that are potentially burdensome. For example, in some instances, the User 20 will require exception processing. For example, in the case of a physician, normally a patient will specifically authorize transmission of a medical record, and therefore highly automated processing may be employed. In emergency situations, however, direct and complete confirmation of authorization may not be possible. In this case, often a manual authentication process will ensue. Likewise, in some cases, a User 20 will fail a biometric test or otherwise not have a required piece of information or security or Authentication Token 23. Likewise, some Users 20 will be automated devices, which may employ special automated authentication protocols. A means is therefore provided for graceful recovery from these situations through exception processing, which may include manual intervention. Thus, this transactional burden may be shifted from the Data Repository 30 to the Intermediary 10.

During an emergency request for authorization, for example where a physician is properly authenticated as the User 20, but the associated patient is unavailable for authentication or authentication is otherwise not possible, the system provides an emergency override mode of operation. In the case of record inputs to the system, the proffered record is assigned a default set of access privileges, and flagged as being an emergency (unauthenticated) record. Later, this record can be fully authenticated, and a specific set of access privileges assigned, when the patient is available, and the emergency flag removed.

When information is requested from the system in the absence of a complete patient authentication, the role of the physician is analyzed for consistency with the nature of the request. A restrictive set of access privileges may be applied, limiting access to only those records originally determined or coded to be "critical", which indeed may have both temporal and contextual sensitivity. Further, the nature of the emergency is analyzed, in addition to the role of the requestor, to further restrict the information available. A personal communication may be initiated to allow a discretionary decision to be made. The accounted transaction fee may take into consideration the costs of authentication and verification; risks borne by the Intermediary or others; and the emergent nature of the requests. Thus, one embodiment of the present invention provides an insurance or indemnity accounting fee for consummating an information transaction.

The Intermediary 10 receives from the User 20 four (or more) pieces of information. As discussed above, the accounting and authentication information are provided. In addition, an identifier of the information sought (or to be transmitted) is also communicated. This is represented in FIG. 1 as the Transaction ID, and typically includes particulars of the record, e.g., patient identification in a medical record system, etc. The Intermediary 10 translates a portion of the Transaction ID into a Record ID, using a Record-Transaction Translation Table 17. The Transaction ID may also include other particulars of the transaction. Finally, the User 20 maintains a public key encryption Key Pair Generator 22. This Key Pair Generator 22 generates a Session Key pair, of which one component is maintained by the User 20 in secrecy, and the other component is transmitted. The User 20 also maintains a Secure Local Storage 21 system, for example for receipt of the private information and to store decryption information, such as the private portion of the key generated by the Key Pair Generator 22.

In a medical environment, the Intermediary 10, as part of the authentication, verifies that the User 20 has an appropriate set of rights to receive the requested information, for example, in a role-based authentication scheme. It is also possible for this "role" information to be passed to and processed by the Data Repository 30, since an access privilege database need not be maintained by the Intermediary 10, and the database might include sensitive information.

The Intermediary 10, after authenticating the User 20, and accounting and logging the transaction, processes the User 20 Public Session Key by internally multiplying this with an Intermediary Private Session Key, generated by the Key Pair Generator 16 and a Record Private Key maintained in a Secure Private Key Database 14. The resulting value is then transmitted, along with the record identification, User 20 identification, and appropriate authentication and transactional logging data, to the Data Repository 30.

In some instances, the User 20 authentication may include an associated identifier, for example a Patient-specific Public Key (ID Public Key) in a medical record system, which allows an additional or substitute layer of security. In addition, a patient could himself act as a User 20, seeking access to his or her own medical records.

In one scenario, the Data Repository 30 receives the information from the Intermediary 10, and recalls the identified record from an Encrypted Database 31. The database record remains encrypted with a Record Public Key, originally generated by the Key Pair Generator 16. The Record Public and Private Keys, in this case, is stored in the Secure Record Key Database 14. An Encryption Processor 15 may be provided to carry the cryptographic processing burden of the Intermediary 10, for example implementing a secure socket layer (SSL) protocol. The encrypted database record from the Encrypted Record Database 31, is presented to the Remote Key Handler 33, a privileged processing environment having both high security and substantial cryptographic processing capacity. The Remote Key Handler 33 implements the algorithm:

$$C^* = C^{d_{record} \cdot d_{intermediary} \cdot e_{user}} \bmod n,$$

wherein:
$d_{record}$ is the Record Private Key,
$d_{intermediary}$ is the Intermediary Private Session Key,
$e_{user}$ is the User Public Session Key,
C is the ciphertext message stored in the Encrypted Record Database, encrypted with the $e_{record}$, the Record Public Key, and
C* is the ciphertext message in a composite-key transcrypted format for transmission to the User.

Likewise, for record accession into the Encrypted Record Database 31 from the User 20, the Remote Key Handler 33 implements the algorithm:

$$C = C^{*e_{record} \cdot d_{intermediary} \cdot e_{user}} \bmod n,$$

wherein:
$e_{record}$ is the Record Public Key,
$d_{intermediary}$ is the Intermediary Private Session Key,
$e_{user}$ is the User Public Session Key, C is the ciphertext message to be stored in the Encrypted Record Database, encrypted with the $e_{record}$, the Record Public Key, and C* is the ciphertext message in a composite-key transcrypted format, received from the User.

It is noted that, while the public key generally corresponds to the encryption key (e), and the private key generally corresponds to the decryption key (d), in the present example, the Remote Key Handler 33 is considered privileged, and therefore receives a key containing the key component designated private. Since the encryption and decryption functions are complementary, the results are the same. The user therefore always applies its own private session key and the intermediary's public session key, regardless of the transaction type.

This processing is performed in the Remote Key Handler 33, based on information from the Intermediary 10 transmitted through a communications channel. This communications channel is preferably secure, such as a virtual private network. The Remote Key Handler 33 is preferably physically proximate or part of the Data Repository 30.

The Data Repository 30 also receives a message intended for it from the Intermediary 10, and may log the transaction using the supplied information. The Data Repository 30 further employs the User Identification to query a Certification Authority 40, maintaining a Public Key Database 41, in order to retrieve a persistent User Public Key. This User Public Key is then further employed by the Encryption Processor 32 to encrypt the Record for communication to the User 20.

In another scenario, the User 20 transmits a Data Record to the Data Repository 30. In this case, the Data Record is encrypted with the User 20 Private Session Key, the Intermediary 10 Public Session Key (received from the Intermediary during a handshaking communications), as well as the User 20 Persistent Private Key corresponding to the certificate stored by the Certification Authority 40 in the public key database 41. The Data Repository 30 then receives the communication, first decrypts it with the User 20 Persistent Public Key received from the Certification Authority 40 from the Public Key Database 41 in the Encryption Processor 32, and then passes it to the Remote Key Handler 33, which securely receives a composite User Public Session Key·Intermediary Private Session Key·Record Public Key product from the Intermediary 10. This is employed by the Remote Key Handler 33 to produce a transcrypted Data Record, encrypted with the Record Public Key (generated by the Intermediary 10 in the Key Pair Generator 16). This Record (encrypted with the Record Public Key) is then passed to the Data Repository 30 and stored in the Encrypted Database 31.

It is noted that in anonymous communications, a proxy may be employed to blind the address of the User 20 from the Data Repository 30. In this case, a modified scheme is employed which may not use a Certification Authority 40, although the Intermediary 10 may provide anonymous certificate services.

It is also noted that each communication channel may itself be secure, for example using 128 bit secure socket layer (SSL) communications or other secure communications technologies. In particular, it is important that only the Intermediary 10 be in possession of the transcryption key (e.g., composite key) and the session key (e.g., Intermediary Private Session Key), since this will allow recovery of the private encryption key.

As noted above, the release of private keys may be limited by having both the Intermediary 10 and User 20 each generate a respective session key pair. In this case, the Intermediary 10 transmits the public portion of its session key pair to the User 20, which is then employed to decrypt the message from the Data Repository 30. The key provided by the Intermediary 10 to the Remote Key Handler 33, in this case, is the product:

Record Private Key·User Public Session Key·Intermediary Private Session Key.

The resulting transcrypted record from the Data Repository 30 is encrypted with the product of the two session keys. Because the transmitted key is a triple composite, the Record Private Key is protected against factorization. The User 20 then uses the User Private Session Key and Intermediary Public Session Key in order to decrypt the Data Record.

In the case of a Data Record transmission from the User 20 to Data Repository 30, the User 20 transmits a record encrypted with the product User Private Session Key·Intermediary Public Session Key Intermediary 10 transmits to the Remote Key Handler 33, the product:

Public Record Key·User Public Session Key·Intermediary Private Session Key which is used to transcrypt the encrypted Data Record with the Public Record Key.

In like manner, the Data Repository 30 may also generate a session key pair, used to sign and authenticate transmissions.

It is therefore seen that, by advantageously using the property of multiplicative identity of modulo arithmetic and the difficulty in factoring large semi-prime numbers, useful additions to the RSA encryption scheme are obtained. These additions allow secure third party involvement in communications, and the substitution of encryption keys without directly passing through a plaintext state.

Example 2

Figure 2:
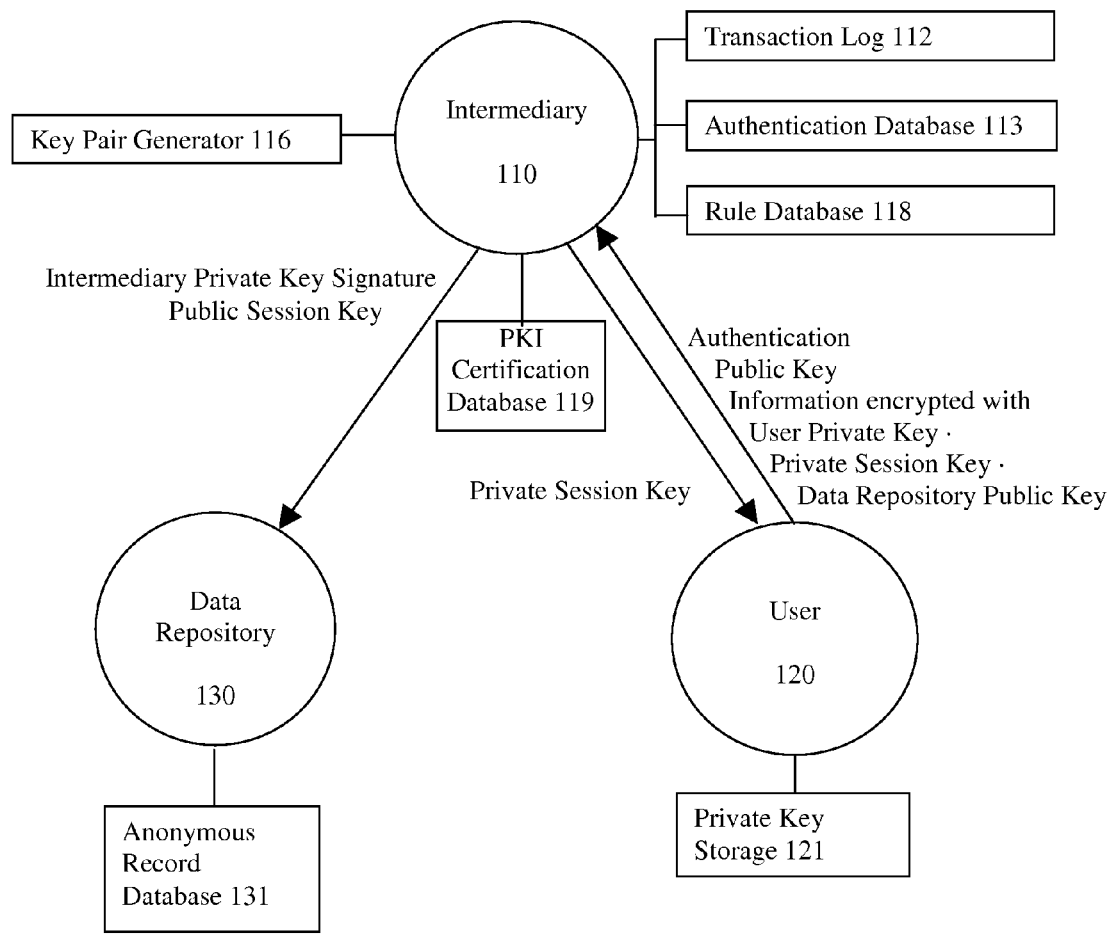
FIG. 2 shows a block diagram of a second embodiment of the communications system according to the present invention.

The transactional details of a second embodiment of the invention are now described with respect to FIG. 2. FIG. 2 is similar to FIG. 1, with a number of simplifications, and notably, an absence of a direct communications path between the User 120 and the Data Repository 130. This allows an anonymous communication through the Intermediary 110 as a proxy.

As shown in FIG. 2, the User 120 transmits a datastream to the Intermediary 110, which includes authentication information, the User's public key, and a message encrypted with:

User Private Key·Private Session Key·Data Repository Public Key

The Intermediary 110 resorts to its Authentication Database 113, PKI Certification Database 119 and Rule Database 118 to verify the authority and access privileges of the User 120. The transactional details are stored in the Transaction Log 112. During the initial communication between the User 120 and Intermediary 110, the Intermediary 110 generates a Public and Private Session Key pair in the Key Pair Generator 116, and transmits one portion to the User 120.

The Intermediary 110 then transcrypts the message transmitted by the User 120 by performing an RSA type decryption operation on the message using the User 120 Public Key, effectively removing personally identifying information from the message while assuring the authenticity and authority of the User 120. The anonymous message is then transmitted to the Data Repository 130, which may then decrypt the message using the other portion of the Session Key (provided by the Intermediary 110) and its own Private Key.

Example 3

Figure 3:
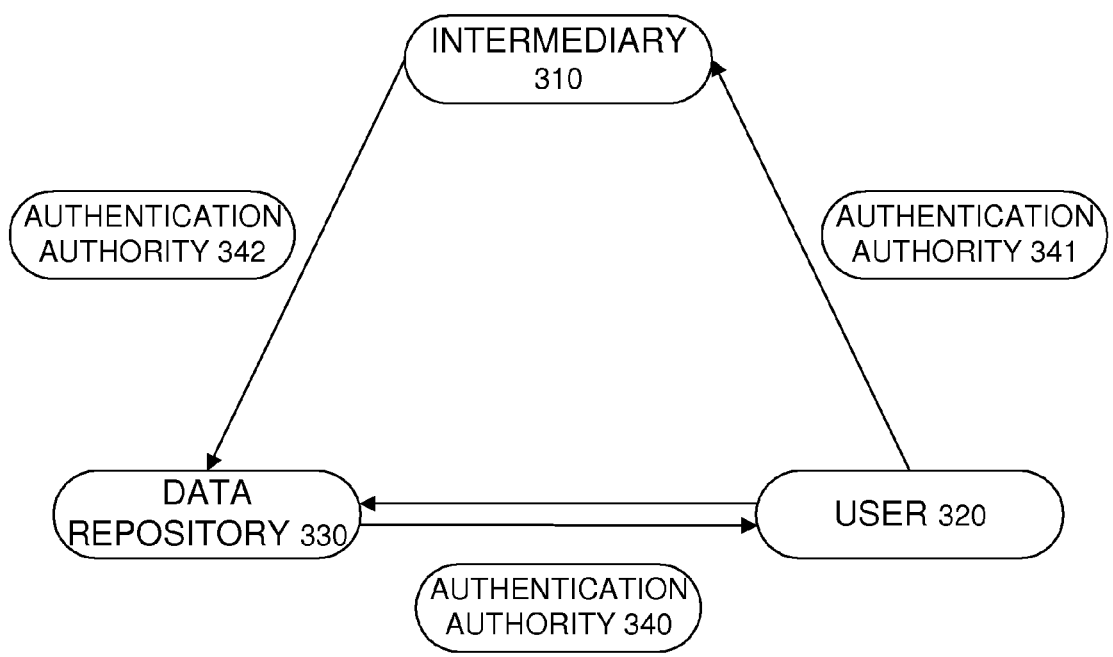
FIG. 3 shows an idealized representation of a three party communication transaction according to the present invention.

FIG. 3 shows a simplified generic schematic arrangement for a three-party transaction. In FIG. 3, three parties are involved in communication of a message. Separate authentication authorities, may serve as traditional certification authorities in a public key infrastructure, or may provide greater or lesser services to respective parties, or may be integrated within one or more of the three integral parties. FIG. 3 shows that the User 320 communicates message set-up information with the Intermediary 310, in a communication in which the authenticity of the parties may be verified by Authentication Authority 341. The Intermediary 310 correspondingly communicates message set-up information to Data Repository 330, in a communication in which the authenticity of the parties may be verified by Authentication Authority 342. Finally, the Data Repository 330 and User 320 conduct an encrypted communication in either direction based on the set-up information, in a communication in which the authenticity of the parties may be verified by Authentication Authority 340. If the Data Repository 330 initiates the communication, the flow paths are reversed. The Intermediary 310 is not a party to the communication proper, and has insufficient information to eavesdrop on the encrypted communication. In a generic case, a mere Diffie-Hellman type key exchange between the User 320 and Data Repository 330 would be sufficient; however, according to an aspect of the present invention, the Data Repository 330 and Intermediary 310 operate under mutual distrust to prevent release of a secret, which can only be transmitted for decryption to the User 320. The Intermediary 310 holds the decryption key for the secret, while the Data Repository 330 holds the encrypted information. The communication set-up information therefore provides a scheme in which the Intermediary 310 passes a composite transcryption key to the Data Repository 330, which includes as masked components the decryption key for the encrypted message, as well as a new session encryption key, for which the User 320 holds the corresponding session decryption key. Thus, neither the Intermediary 310 nor the Data Repository 330 ever possesses sufficient information to obtain message in decrypted form.

The Authentication Authorities 340, 341, 342 provide means for independent assurance that each party to the communication is the intended party, thus limiting the ability of any one party from undermining the security of the scheme. On the other hand, the ability of two parties to act together and in cooperation to obtain the secret message serves as a feature to allow recovery of the secret message in case of emergency.

Example 4

Figure 4A:
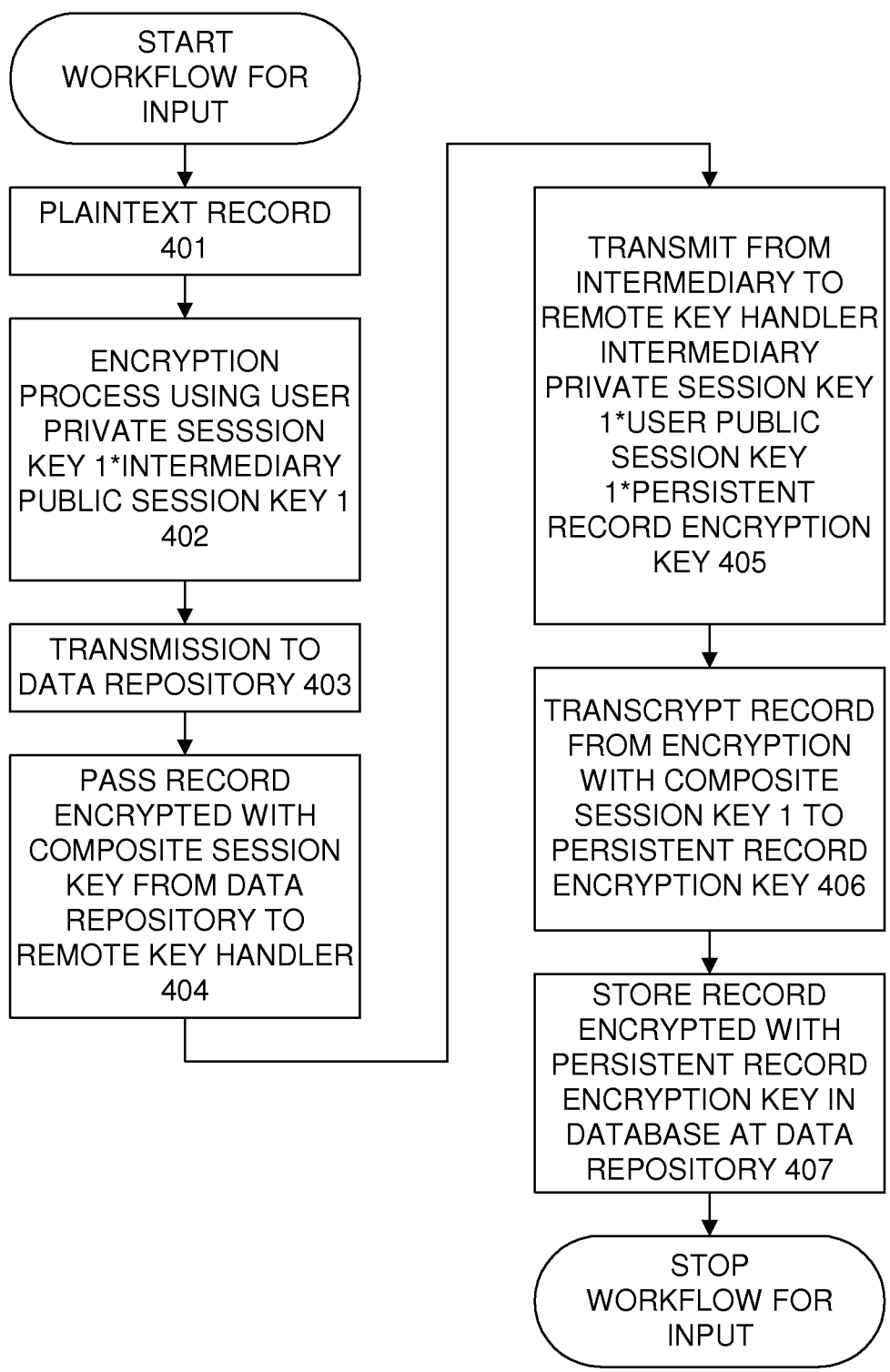
FIGS. 4A and 4B show workflow diagrams for the input and output of encrypted records according to the present invention.

FIG. 4A shows a workflow diagram for the input of encrypted records by the User 20 with respect to the system of the Data Repository 30. Initially, a Plaintext Record 401 is encrypted by the User 20 in a process 402 using the User Private Session Key 1*Intermediary Public Session Key 1. The User 20 generates the User Private Session Key pair and receives the public portion of the Intermediary 10 Session Key communicated in the set-up communication. A message is then sent 403 from the User 20 to the Data Repository 30, including the record encrypted with the composite (product of two or more PKI keys having the same modulus) session key 1 (User Private Session Key 1*Intermediary Public Session Key 1). The Data Repository 30 passes 404 the encrypted record to the Remote Key Handler 40. The Intermediary 10 then communicates 405 Composite Session Key 1 comprising the Intermediary Private Session Key 1*User Public Session Key 1*Persistent Record Encryption Key. The Record encrypted with Composite Session Key 1 is then processed 406 in a transcryption process to yield a record encrypted with only the Persistent Record Encryption Key, the other key components having been eliminated. The record encrypted with the Persistent Record Encryption Key is then stored 407 in the Record Database 31 at the Data Repository 30.

Figure 4B:
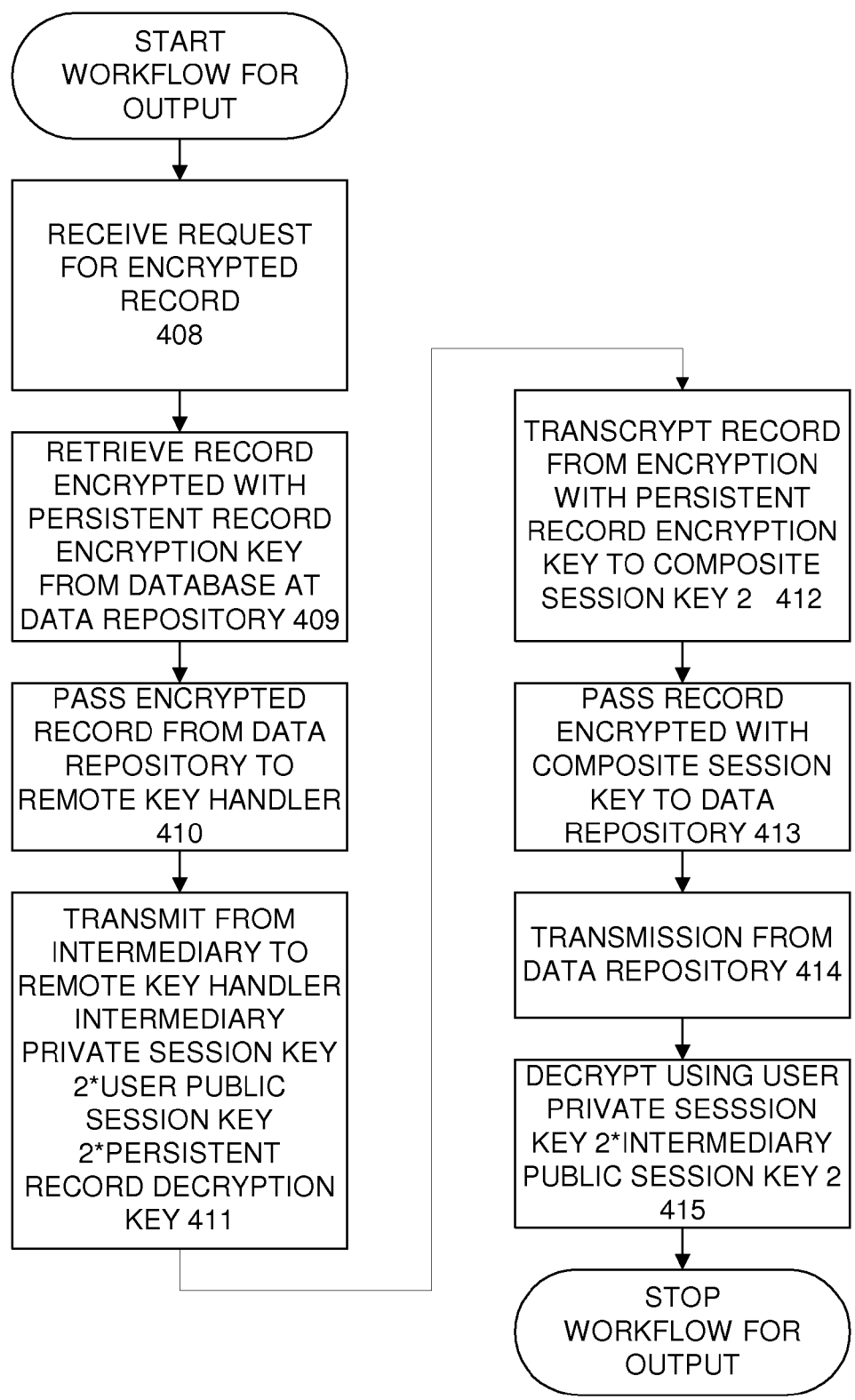

To output the record, as shown in FIG. 4B, a complementary process is followed. A request is received 408 for the encrypted record. The Record encrypted with the Persistent Record Encryption Key is retrieved 409 from the Record Database 31 at the Data Repository 30, and passed 410 to the Remote Key Handler 40. The Intermediary 10 then transmits 411 to the Remote Key Handler 33 the Composite Session Key 2 comprising the Intermediary Private Session Key 2*User Public Session Key 2*Persistent Record Decryption Key. The Remote Key Handler 40 then processes 412 the Record encrypted with the Persistent Record Encryption Key with the received key to yield a Data Record encrypted with the Composite Session Key 2 (Intermediary Private Session Key 2*User Public Session Key 2), the Persistent Record Encryption Key having been eliminated in the transcryption process. The Record encrypted with Composite Session Key 2 is then passed 413 to the Data Repository 30. The Data Repository 30 transmits 414 the encrypted Data Record encrypted with Composite Session Key 2 to the User 20. The Data Record encrypted with Composite Session Key 2 is then decrypted 415 with the Intermediary Public Session Key 2*User Private Session Key 2, the Intermediary Public Session Key 2 having been received from the Intermediary 10 and the User Private Session Key 2 being generated by the User 20 at the beginning of the transaction set-up. The User 20 thus obtains the plaintext record.

Figure 5:
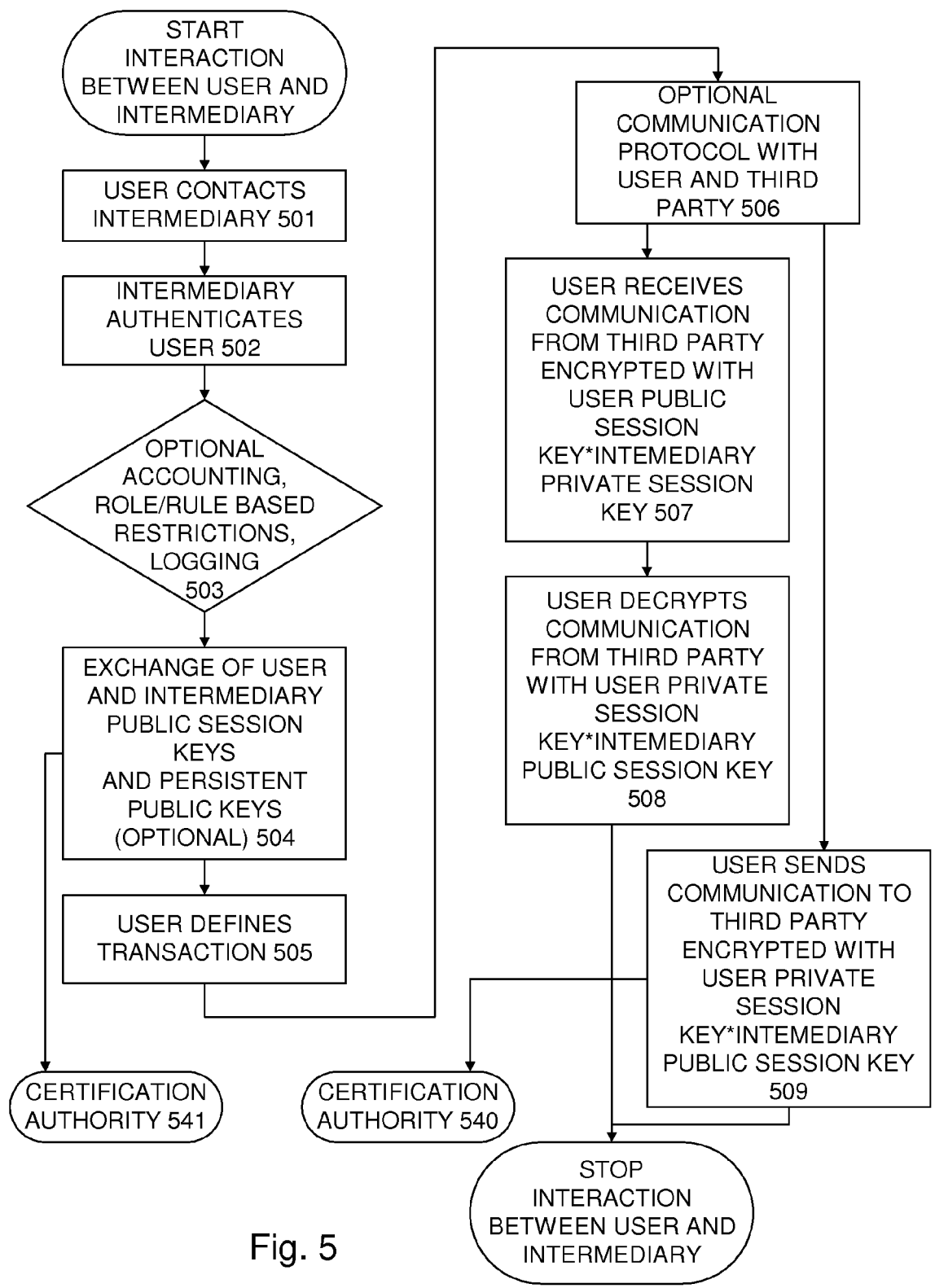
FIG. 5 shows a flowchart of the actions of the user during typical transactions according to the present invention.

FIG. 5 provides a flowchart of the actions of the User 20 during typical transactions. The User 20 contacts 501 the Intermediary 10, and during the ensuing communication the Intermediary 10 authenticates 502 the User 20. After authentication 502, the Intermediary 10 conducts 503 an optional accounting, implements rule and/or role based restrictions, and logs the transaction. The User 20 and Intermediary 10 then exchange 504 public session keys and optionally respective Persistent Public Keys, retaining their respective private session keys. A Certification or Authentication Authority 541 may also provide further assurance of the identity of the various parties. The User 20 also defines 505 the nature of the desired transaction, for example uploading or downloading a Data Record. The Intermediary 10 then communicates with a third party, e.g., the Data Repository 30, in steps shown elsewhere.

An optional communication protocol is conducted 506 between the User 20 and a third party, e.g., the Data Repository 30, to establish communication parameters and the like. In the case of a Data Record download, the User 20 receives 507 information from the third party encrypted with the User Public Session Key*Intermediary Private Session Key, and then decrypts 508 the information with the User Private Session Key*Intermediary Public Session Key. In the case of an upload of data, the User 20 sends 509 information to the third party encrypted with the User Private Session Key*Intermediary Public Session Key. The Certification Authority 540 may provide authentication services for communication between the User 20 and the third party.

Figure 6:
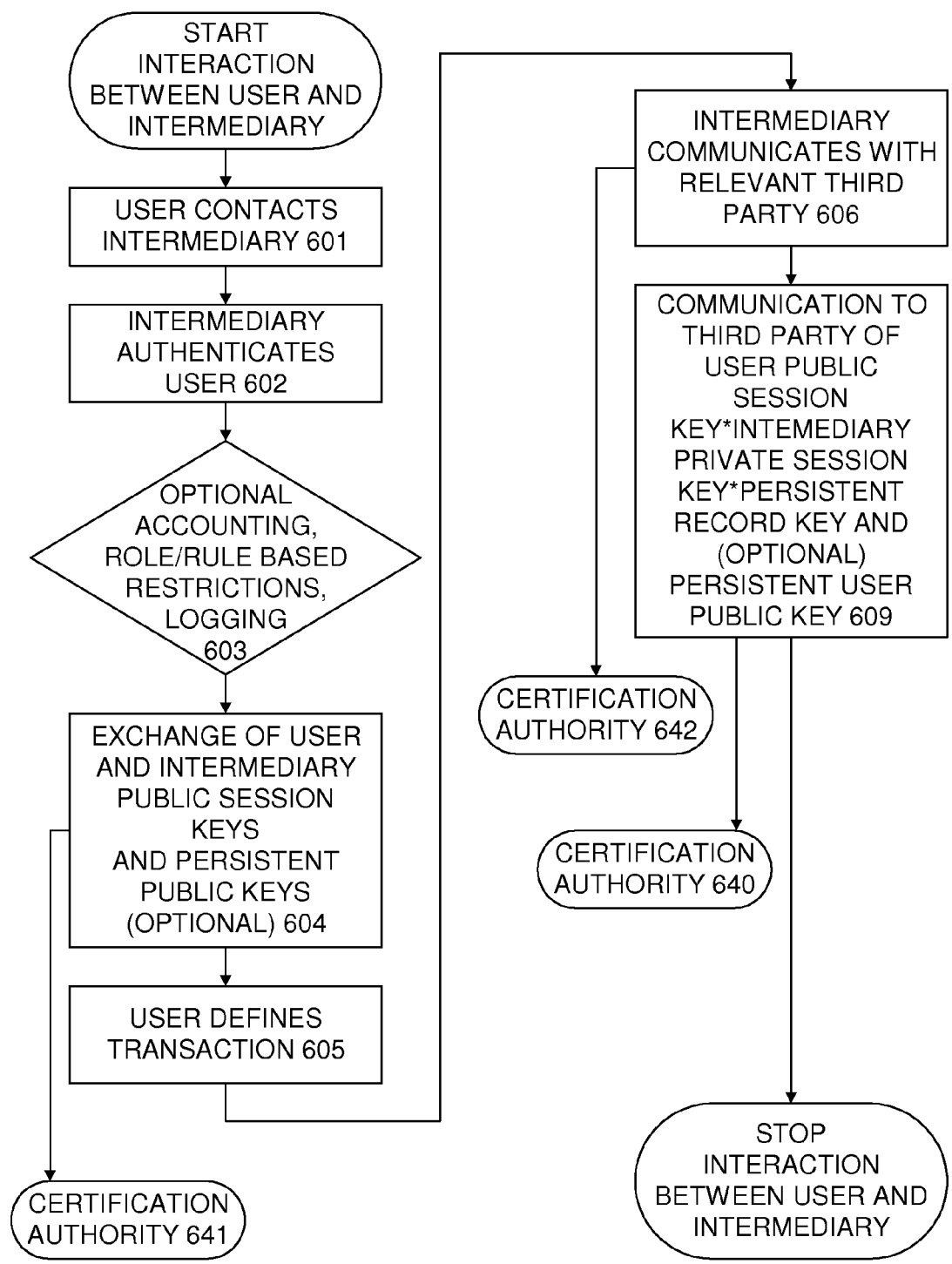
FIG. 6 shows a flowchart of the actions of the intermediary during typical transactions according to the present invention.

FIG. 6 provides a flowchart of the actions of the Intermediary 10 during typical transactions. The User 20 contacts 601 the Intermediary 10, and during the ensuing communication the Intermediary 10 authenticates 602 the User 20. After authentication 602, the Intermediary 10 conducts 603 an optional accounting, implements rule and/or role based restrictions, and logs the transaction. The User 20 and Intermediary 10 then exchange 604 public session keys, and optionally respective Persistent Public Keys, retaining their respective private session keys. A Certification Authority 641 or authentication authority may also provide further assurance of the identity of the various parties. The User 20 also defines 605 the nature of the desired transaction, for example uploading or downloading a Data Record. The Intermediary 10 then communicates 606 with a third party, e.g., the Data Repository 30. This communication may be authenticated with Certification Authority 642 or authentication authority.

The Intermediary 10 then communicates 609 the Composite Session Key comprising the User Public Session Key*Intermediary Private Session Key*Persistent Record (Public or Private) Key to the third party, e.g., Data Repository 30 or Remote Key Handler 40, depending on system architecture. The impending communication between third party and User 20 may be authenticated through the Certification Authority 640 or authentication authority.

Figure 7:
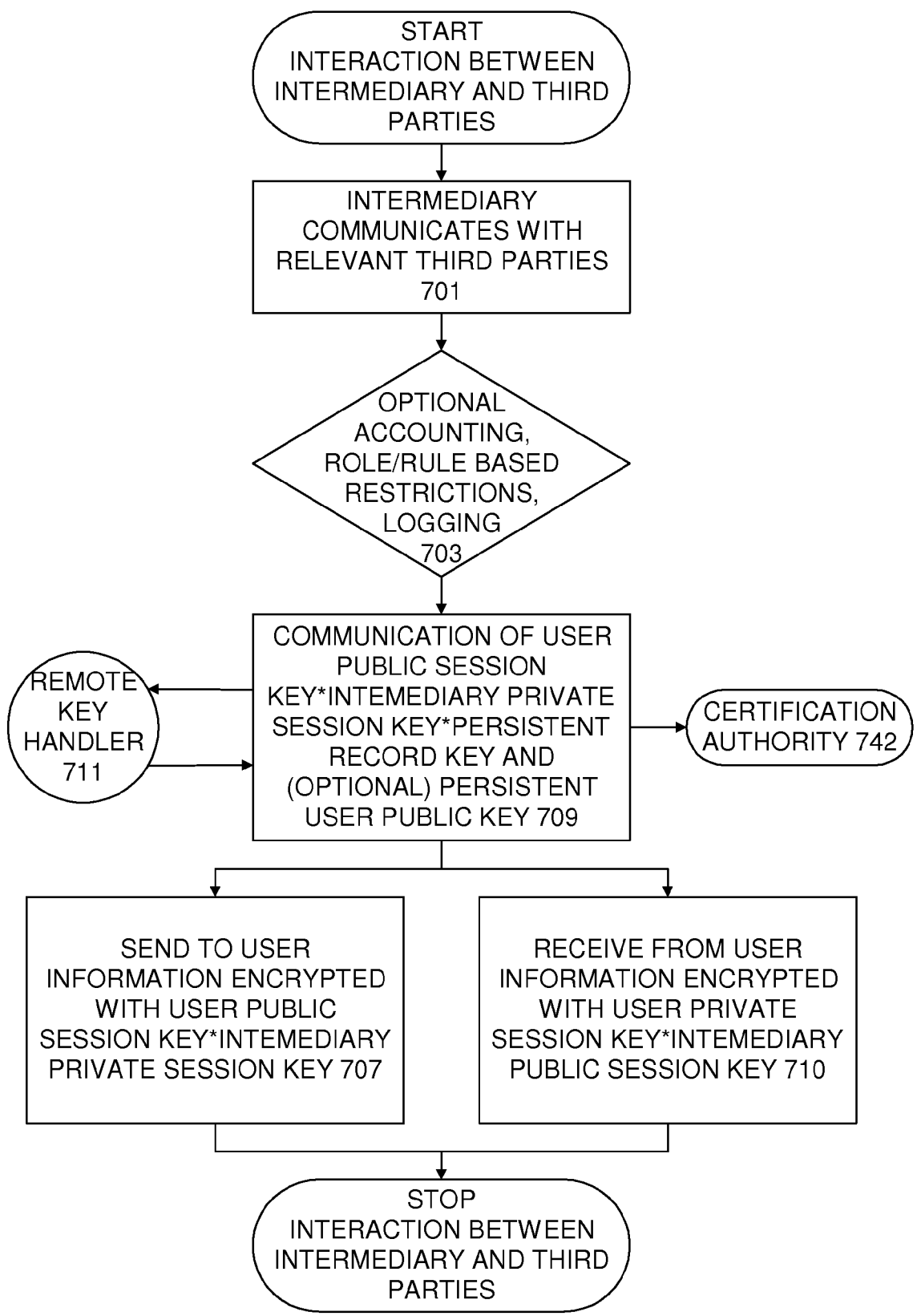
FIG. 7 shows a flowchart of the actions of a third party to the transaction according to the present invention.

FIG. 7 provides a flowchart of the actions of the third party, e.g., Data Repository 30 during typical transactions. The Intermediary 10 communicates 701 with the relevant third party or parties. The Intermediary 10 conducts 703 an optional accounting, implements rule and/or role based restrictions, and logs the transaction. The Intermediary 10 communicates 709 the Composite Session Key comprising the Intermediary Private Session Key*User Public Session Key*Persistent Record Encryption Key and optionally, the Persistent User Public Key, through the third party, to the Remote Key Handler 711, where the Record Key is eliminated. A Certification Authority 742 may provide authentication services. The third party then sends 707 information to the User 20 encrypted with the User Public Session Key*Intermediary Private Session Key, or receives 710 from the User information encrypted with the User Private Session Key*Intermediary Public Session Key.

Figure 8:
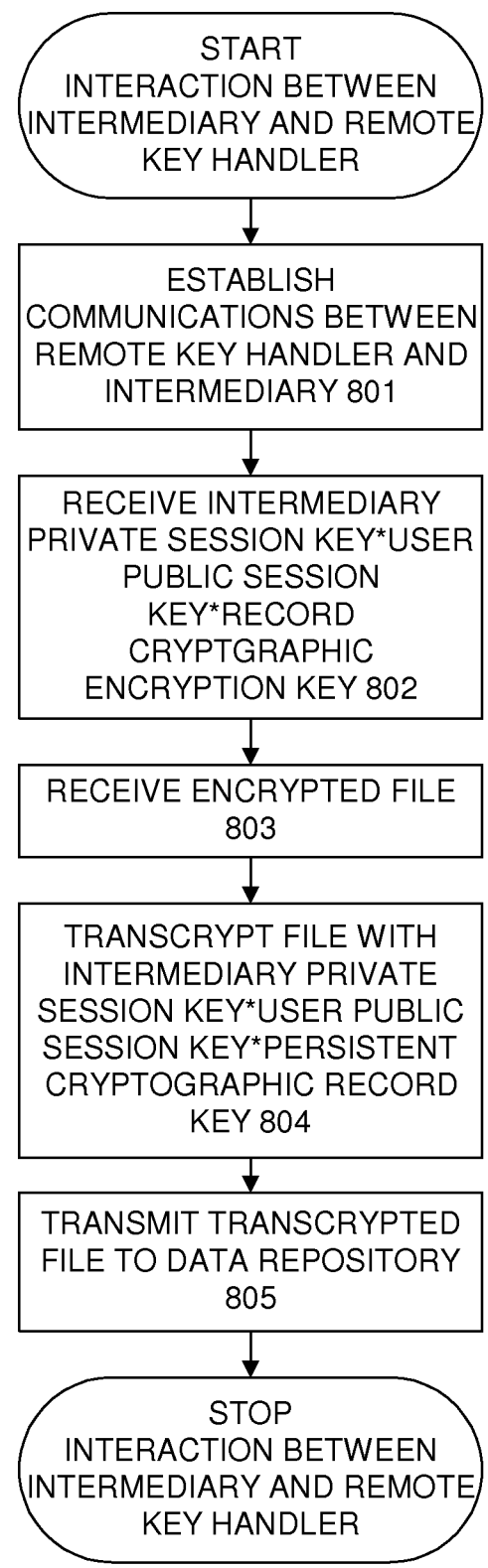
FIG. 8 shows a flowchart of the actions of the remote key handler according to the present invention.

FIG. 8 provides a flowchart of the actions of the Remote Key Handler 40 during typical transactions. Communications are established 801 between the Remote Key Handler 40 and the Intermediary 10. The Remote Key Handler 40 then receives 802 the Intermediary Private Session Key*User Public Session Key*Persistent Record Cryptographic Key (Public or Private). An encrypted file is received 803 through a Data Repository 30, which is then transcrypted 804 with the received the Intermediary Private Session Key*User Public Session Key*Persistent Record Cryptographic Key (Public or Private). The transcrypted file is then transmitted 805 to the Data Repository 30.

Figure 9:
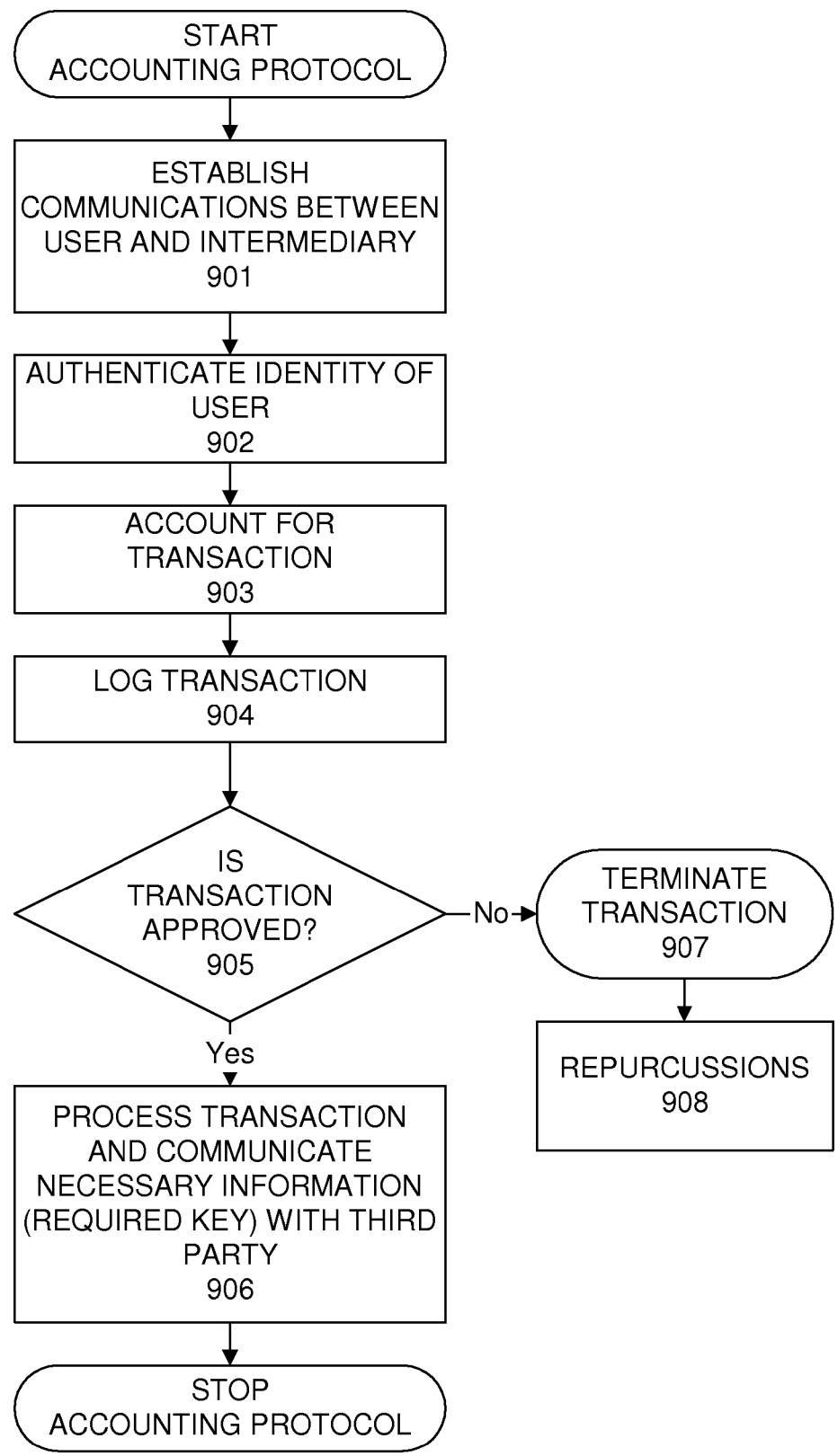
FIG. 9 provides a flowchart of an accounting protocol according to the present invention.

FIG. 9 provides a flowchart of an accounting protocol. Communications are established 901 between the User 20 and the Intermediary 10. The User 20 is authenticated 902. The transaction or proposed transaction is then accounted 903 for, for example by performing a financial charge against an account. The transaction and/or proposed transaction are then logged 904. The transaction parameters are then tested for approval 905, and if not approved, the transaction terminated 907 and various repercussions 908 implemented, for example, to ensure system security. If the transaction is approved, it is processed 906 and the Intermediary 10 communicates necessary key information, to facilitate the ultimate transaction between the User 20 and the third party, e.g., Data Repository 30.

Example 5

The algorithm according to the present invention may also be used in other circumstances where it is desired that a third party control decryption of a message without having access to the message itself. For example, a current trend is to secure electronic mail communications by providing a third party encryption, wherein the recipient must request a decryption key from a third party in order to reveal the message. This is advantageous, for example, where the availability of the decryption key is time limited, thus allowing the electronic communication to expire. According to the Disappearing Inc. system, a symmetric cipher, the so-called Blowfish cipher, is employed. Therefore, if the encrypted message is made available to the server which hosts the encryption key, the privacy of the message is potentially impaired.

According to the present invention, see FIG. 3, the Intermediary never has access to sufficient information to decrypt any publicly transmitted information. Presuming that the Data Repository (receiver of the information) and the User (sender of the information), choose to maintain the secrecy of the message, the interception of the message by the Intermediary does not impair the security of the system. Likewise, because security of the system does not require the Intermediary to be shielded from the ciphertext message, the Intermediary can, in fact, serve as a proxy or host for the communications, see FIG. 2.

Thus, in implementation, a secure three party communication system is provided as follows. The User 320 creates a message for the Data Repository 330. The Data Repository 330 publishes a public key, which is available to the User 320. The Intermediary 310 receives a message from the User 320, initiating a transaction. The User 320 receives the Intermediary Public Session Key from the Intermediary 310 as well as a unique identifier for the message. The User 320 then computes the composite encryption key from Data Repository Public Key*Intermediary Public Session Key, and encrypts the message using this composite key, and sends it to the Data Repository 330.

In order to decrypt the message, the Data Repository 330 communicates with the Intermediary 310, provides the unique identifier of the message, and receives the Intermediary Private Session Key. The Data Repository 330 then computes the composite decryption key from Data Repository Private Key*Intermediary Private Session Key, and decrypts the message using this composite key.

The session key pair generated by the Intermediary 310 is used once, and may be expired or controlled based on a set of rules. Thus, the Intermediary 310 may have a policy of destroying keys after a set time period or upon existence of a condition. Since the security of the encryption is analogous to RSA-type encryption, it can be made relatively secure. Since the Intermediary 310 has no access to the Data Repository Private Key, the message cannot be decrypted based on information available to it. In addition, higher order composite keys may be implemented, for example composites formed of three or more RSA-type keys, some of which may be enduring keys (for example to provide digital signature capability) and other session keys.

It is noted that various features of the known Dissapearing Inc. (San Francisco, Calif.) system, expressly incorporated herein by reference, may be employed in conjunction with the present invention. Thus, for example, special application software may be provided for restricting use by the recipient, thus preventing circumvention of the key restrictions.

Example 6

Another example according to the present invention provides a system for communicating a private message between two parties, wherein a third party controls access by the recipient to the message. Thus, an encrypted communication is sent by arbitrary means to a recipient, and a third party key management agent must communicate decryption information to the recipient in order to comprehend the message.

According to the present invention, in order for the recipient to obtain the necessary decryption information, accounting, authentication, and logging are implemented. According to a preferred embodiment, the decryption is preferably implemented by controlled application software, which prevents export of the message, such as by printing, disk storage, or the like. Therefore, within a reasonable extent, the message is isolated within the controlled application. The right of the user to access a comprehensible version of the message may be temporally limited, for example with an expiration date. These rights may also be limited based on a specified condition. Further use would require either a new transmission of the message, or a further accounting and logging of activity. Further, this allows control over the message on a per use basis, potentially requiring each user of the controlled application to authenticate himself or herself, and provide accounting information. Each use and/or user may then be logged.

It is also possible to permit anonymity of one party, for example a sender of a message, by employing anonymous cryptographic protocols, such as a employed in micropayment technology. Thus, a sender of a message may provide an anonymous accounting by employing an anonymous micropayment to account for the message transmission.

This technique therefore provides client-side security for messages, including medical records. By employing a third party for key management, burden on the sender is reduced.

Example 7

For completeness, applicants provide a description of various known proxy cryptographic schemes derived from Wang, U.S. Pat. No. 6,937,726, expressly incorporated herein by reference, which may be used in conjunction with the present invention, in place of, or in conjunction with, the algorithms and techniques described herein.

Proxy Encoding Schemes

For simplicity, initially consider encoding schemes of the following type. An encoding system consists of four components: (i) a message space X which is a collection of possible messages, (ii) a key space K which is a set of possible keys, (iii) a computationally efficient encoding transformation $E:K \cdot X \to X$ and (iv) a computationally efficient decoding transformation $D:K \cdot X \to X$. For each $k \in K$, the encoding transformation $E_k:X \to X$ and decoding transformation $D_k:X \to X$ are injection (one-to-one) mappings on X, and they satisfy that, for every message $x \in X$, $D_k(E_k(X))=x$.

Certainly, such defined encoding schemes can be varied in several ways to cover a wider range of ones. One is to differentiate the space of encoded messages from the one of original messages, and another is to consider that keys used for encoding and decoding are different. In terms of cryptography, the encoding schemes considered below are essentially private-key (or, more precisely, symmetric), endomorphic cryptosystems.

Such defined encoding schemes have some advantageous properties. Given an encoding scheme (X, K, E, D), each encoding transformation and its corresponding decoding transformation are inverse transformation of each other; that is, for each $k \in K$, $D_k=(E_k)^{-1}$ and $E_k=(D_k)^{-1}$. If X is a finite set, each encoding or decoding transformation is just a permutation on X.

Classic, symmetric-key encryption schemes are encoding schemes. Here are some of them.

XOR Scheme X. In this scheme, the message space X is the set $B_n$ of all n-bit binary strings for some integer $n>0$, and so is the key space K. The number of possible messages and the number of possible keys are both $2^n$. For each message x and each key k, the encoding is $y=E_k(x)=\oplus k$, and the decoding of message y is $x=D_k(y)=y \oplus k$; where $\oplus$ represents the bit-wise XOR (exclusive or) operation.

Multiplicative Scheme M. A message in this scheme is an element in $X=Z_n=\{0, 1, \ldots, n-1\}$ for some integer $n>0$. A key is also an element a in but satisfying $\gcd(a, n)=1$, where the "gcd" function specifies the greatest common integer divisor of the two arguments. That is, the key space K consists of the elements in the multiplicative group $Z^*_n=\{a \in Z_n | \gcd(a,n)=1\}$. The encoding of a message x with a key a is $y=E_a(x)=ax \pmod{n}$ and the decoding of a message y with a key a is $x=D_a(y)=a^{-1}y \pmod{n}$, where $a^{-1}$ is the multiplicative inverse of a modulo n; that is, $a^{-1}$ is an element in such that $a \cdot a^{-1} \pmod{n}=a^{-1} \cdot a \pmod{n}=1$. Note that the condition on a, $\gcd(a, n)=1$, is used to guarantee that a has the inverse $a^{-1}$. It is known that the number of such as is equal to the value of the Euler phi-function $$\phi(n) = \prod_{i=1}^{m} \left(p_i^{e_i} - p_j^{e_i-1}\right) \text{ where } n = \prod_{n-1}^{m} p_i^{e_i}$$

is the prime decomposition of n. So the number of keys in the scheme M is $\phi(n)$.

Shift Scheme S. Messages and keys of the shift scheme, are all elements in $Z_n=\{0, 1, \ldots, n-1\}$ for some integer $n>0$; that is, $X=K=Z_n$. Thus, the number of messages and the number of keys in the shift scheme are all equal to n. To encode a message x with a key b, one calculates $y=E_b(x)=x+b \pmod{n}$ and to decode a message y with b, one computes $x=D_b(y)=y-b \pmod{n}$.

Substitution Scheme P. This scheme is also defined over $X=Z_n$ However, the key space $K=\Pi_n$ consists of all permutations of elements in $Z_n$. Thus, the total number of keys is $n!$. For each permutation $p \in \Pi_n$ the encoding is $y=E_p(x)=p(x)$, while the decoding is $x=D_p(y)=p^{-1}(y)$, where $p^{-1}$ is the inverse permutation of p.

It should be noted that the multiplicative and shift schemes are special cases of the substitution scheme which include only $\phi(n)$ and n of the $n!$ possible permutations of n elements, respectively.

New encoding schemes can be constructed by combining existing ones. One way is to form their "product." Suppose S and S' are two encoding schemes with the same message space X. The product of S and S', denoted by S·S', has the same message space X. A key of the product scheme has the form (k, k'), where k and k' are keys of S and S', respectively. The encoding and decoding transformations of the product scheme are defined as follows: for each key $(k,k') \in K$, $E_{(k,k')}(x)=E_{k'}(E_k(x))$ and $D_{(k,k')}(x)=D_k(D'_k(c))$. That is, the message x is first encoded with $E_k$, and the resulting message is then "re-encoded" with $E_k'$. Decoding is similar, but it is done in the reverse order.

It is straightforward to check that the product construction is always associative: $(S \cdot S') \cdot S''=S \cdot (S' \cdot S'')$. If an encoding scheme S is taken to form the product with itself, one obtains the scheme S·S, denoted by $S^2$. If the n-fold product is taken, the resulting scheme, denoted by $S^n$, is called an iterated encoding scheme.

A simple example to illustrate the definition of product encoding schemes is as follows.

Affine Scheme A. This scheme is also defined over $X=Z_n$. A key of the affine scheme is a pair of integers (a, b) in $Z_n$, where gcd(a, n)=1. The encoding transformation is $y=E_{(a, b)}(x)=(ax+b)(\bmod n)$ and the decoding transformation is $x=D_{(a, b)}(y)=a^{-1}(y-b)(\bmod n)$, where $a^{-1}$ is the modular inverse of a modulo n. These transformations of the type ax+b are usually called affine transformations, hence the name affine scheme. Note that the scheme A reduces to the multiplicative scheme M when b=0 and the shift scheme S when a=1. Thus, M and S are special cases of A. On the other hand, A is their product M·S. As seen before, a key in the multiplicative scheme M is an element $a \in Z^*_n$; the corresponding encoding transformation is $E_a(x)=ax(\bmod n)$. A key in the shift scheme is an element $b \in Z_n$, and the corresponding encoding transformation is $E_b(x)=x+b \pmod{n}$. Hence, a key in the product scheme M·S has the form $(a,b) \in Z^*_n \cdot Z_n$, and its encoding is $E_{(a, b)}(x)=E_b(E_a(x))=ax+b(\bmod n)$.

This is precisely the definition of the encoding transformation in the affine scheme. Similarly, the decoding transformation in the affine scheme is the composition of the decoding transformations of the shift and multiplicative schemes.

The objective of transferring the right to decode messages in any given encoding scheme (X, K, E, D) can be stated as follows: for any given message $x \in X$ and keys $k, k' \in K$, convert in some efficient way the encoded message $y=E_k(x)$ using the key k into the encoded message $y'=E_{k'}(x)$ using the key k' so that the new message y' can be decoded correctly using the key k'. If this can be achieved, it is said that the right to decode the message y has been transferred or delegated from the key holder of k to the key holder of k'.

In many cases, the key space K of an encoding scheme is not merely a set. Equipped with some operation "*", K may possess some mathematical structure. For instance, the key spaces of all the example schemes given in the previous section can be equipped with some operations to become mathematical groups. Table 1, below, shows some of these operations, where $\bigcirc$ stands for the composition operator of permutations and $*:(Z^*_n \times Z_n) \times (Z^*_n \times Z_n) \rightarrow Z^*_n \times Z_n$ is defined as $(a,b)*(a',b')=(a'a(\bmod n), a'b+b'(\bmod n))$.

TABLE 1

| Scheme | Key Space "K" | Operation "•" |
|---|---|---|
| X | $B_n$ | $\oplus$ (XOR) |
| M | $Z^*_n$ | x (mod n) |
| S | $Z_n$ | + (mod n) |
| P | $\Pi_n$ | $\circ$ (composition) |
| A | $Z^*_n \times Z_n$ | * (defined above) |

When the key space K of an encoding scheme (X, K, E, D) is a group with some operation "*", the encoding and decoding transformations may be uniquely determined by the keys. This happens when the key space K is isomorphic, as a group, to the transformation groups $E=\{E_k | k \in K\}$ and $D=\{D_k | k \in K\}$ formed by the encoding and decoding transformations on the message space X; that is, for any $k, k' \in K$, $D_k=(E_k)^{-1}=E_{k^{-1}}$ and $E_k \bigcirc E_{k'}=E_{k \cdot k'}$ and $E_k=(D_k)^{-1}=D_{k^{-1}}$ and $D_k \bigcirc D_{k'}=D_{k \cdot k'}$, where $\bigcirc$ is the composition operator of the transformations, which is defined as, for example, $E_k \bigcirc E_{k'}(x)=E_{k'(E_k x)}(x)$ for all $x \in X$.

It can be easily checked that all the schemes given in Table 1 above are key-determined. Key-determined encoding schemes permit a systematic way to transfer the right to decode messages from one key holder to another. With the isomorphism between the key space and the transformation groups, the composition of the decoding transformation with one key k and the encoding transformation with another key k' can then be viewed as the encoding transformation determined by the composed key $k^{-1} \cdot k$. Let (X, K, E, D) be a key-determined encoding scheme. Suppose $y=E_k(x)$ is the encoded version of the message $x \in X$ with the key $k \in K$. The right to decode the encoded message of x can be transferred from the key holder of k to the key holder of k' in a two-step algorithm. First, generate a transfer key $t=k^{-1} \cdot k$. Then encode the message with the transfer key t according to $y'=E_t(y)$. The algorithm is correct thanks to the property of the key space being isomorphic to the encoding and decoding transformation groups. The correctness can be verified as follows:

$$D_{k'}(y') = D_{k'}(E_t(y))$$
$$= D_{k'}(E_{k^{-1} \cdot k'}(y))$$
$$D_{k'}(E_{k'}(E_{k^{-1} \cdot k'}(y)))$$
$$= E_{k^{-1}}(y)$$
$$= D_k(y)$$
$$= D_k(E_k(x))$$
$$= x$$

The generality of the algorithm makes it immediate to derive the transference steps for the example schemes set forth above. For the XOR Scheme X over $B_n$, to convert $y=E_k(x)$ to $y'=E_{k'}(x)$, first generate a transfer key $t=k \oplus k'$. Then encode the message with the transfer key t according to $y'=y \oplus t$.

For the Multiplicative Scheme M over $Z^*_n$, to convert $y=E_a(x)$ to $y'=E_{a'}(x)$, first generate a transfer key $t=a'a^{-1}(\bmod n)$. Then encode the message with the transfer key t according to $y'=ty(\bmod n)$. For the Shift Scheme S over $Z_n$, to convert $y=E_b(x)$ to $y'=E_{b'}(x)$, first generate a transfer key $t=b'-b(\bmod n)$. Then encode the message with the transfer key t according to $y'=y+t(\bmod n)$. For the Substitution Scheme P over $\pi_n$, to convert $y=E_p(x)$ to $y'=E_{p'}(x)$, first generate a transfer key $t=p^{-1} \bigcirc p'$. Then encode the message with the transfer key t according to $y'=t(y)$.

As will be described below, it is also possible to transfer the right to decode in product schemes of not only key-determined encoding but also commuting schemes. In order to define commuting schemes, it is necessary to characterize encoding schemes that are essentially equivalent. Suppose that S=(X, K, E, D) and S'=(X, K', E', D') are two encoding schemes with the same message space X. S is said to be equivalent to S', denoted by S≡S', if there is a bijective (one-to-one and onto) mapping $h: K \rightarrow K'$ such that for each message $X \in X$ and for each key $k \in K$, $E_k(x)=E'_{h(k)}(x)$ and $D_k(x)=D'_{h(k)}(x)$.

Clearly, the scheme equivalence relation ≡ is an equivalence relation; that is, it satisfies that, for any encoding schemes S, S', S'', the following hold: (i) S≡S; (ii) S≡S' implies S'≡S; and (iii) S≡S' and S'≡S'' imply S≡S''. Thus, equivalent encoding schemes form an equivalence class in that each scheme in the class provides no more and no less functionality than any others in the class.

The scheme equivalence relation allows one to characterize encoding schemes in several ways. An encoding scheme S is said to be idempotent if $S^2 \equiv S$. Many of the encoding schemes are idempotent, including the XOR, multiplicative, shift, substitution, and affine schemes. If a scheme S is idempotent, then there is no point in using the product scheme $S^2$, as it requires an extra key but provides no more functionality.

Another characterization on encoding schemes using the scheme equivalence relation ≡ is that of commuting schemes.

Two encoding schemes S and S' are said to commute if $S \cdot S' \equiv S' \cdot S$. Trivially, any scheme commutes with itself. A not-so-trivial example is that of the multiplicative scheme M and the shift scheme S. To see that they commute, i.e., $M \cdot S \equiv S \cdot M$, one can compare the equations $E_b(E_a(x)) = ax + b \pmod{n}$ and $E_a(E_b(x)) = ax + ab \pmod{n}$; and find out that the mapping $h: K_X \times K_M \to K_M \times K_S$ defined by $h(b, a) = (a, a^{-1}b \pmod{n})$ makes the product $S \cdot M$ isomorphic to the product $M \cdot S$.

Product schemes of key-determined and commuting encoding schemes enjoy a systematic way of transferring the right to decode messages. Let $S_1 \cdot S_2$ be the product scheme of two key-determined and commuting encoding schemes. Suppose that $h = (h_1, h_2): K_2 \cdot K_1 \to K_1 \cdot K_2$ is the mapping that makes $S_2 \cdot S_1$ isomorphic to $S_1 \cdot S_2$, where $h_1: K_2 \cdot K_1 \to K_1$ and $h_2: K_2 \cdot K_1 \to K_2$. First, observe that the product scheme is also key-determined; the product key space $K_1 \cdot K_2$ is a group with respect to the operation $*$ defined by $(k_1, k_2) * (k'_1, k'_2) = (k_1 \cdot h_1(k_2, k'_1), h_2(k_2, k'_1) \cdot k'_2)$. This is because $$E_{(k'_1, k'_2)} \circ E_{(k'_1, k'_2)} = E_{k_1} \circ E_{k_2} \circ E_{k'_1} \circ E_{k'_2}$$

$$= E_{k_1} \circ E_{h_1(k_2, k'_1)} \circ E_{h_2(k_2, k'_1)} \circ E_{k'_2}$$

$$= E_{k_1 \cdot h_1(k_2, k'_1)} \circ E_{h_2(k_2, k'_1) \cdot k'_1}$$

$$= E_{(k_1, k_2) * (k'_2, k'_1)}$$

Now, the right to decode the encoded message of x can be transferred from the key holder of k to the key holder of another key k' in the two-step algorithm. First, generate a transfer key $t = (h_1(k_2^{-1}, k_1^{-1} \cdot k'_1), h_2(k_2^{-1}, k_1^{-1} \cdot k'_2))$. Then encode the message with the transfer key t according to $y' = E_t(y)$. The correctness of the transference algorithm is verified by the following equality:

$$E_t(y) = E_{h_1(k_2^{-1}, k_1^{-1} \cdot k'_1)} \circ E_{h_2(k_2^{-1}, k_1^{-1} \cdot k'_1) \cdot k'_2(y)}$$

$$= E_{h_1(k_2^{-1}, k_1^{-1} \cdot k'_1)} \circ E_{h_2(k_2^{-1}, k_1^{-1} \cdot k'_1)} \circ E_{k'_2}(y)$$

$$= E_{h_2^{-1}} \circ E_{k_1^{-1} \cdot k'_1} \circ E_{k'_2}(y)$$

$$= E_{k_2^{-1}} \circ E_{k_1^{-1}} \circ E_{k'_1} \circ E_{k'_2}(y)$$

$$= D_{k_2} \circ D_{k_1} \circ E_{k'_1} \circ E_{k'_2}(y)$$

$$= E_{k'_1} \circ E_{k'_2}(x)$$

$$E_{(k'_1, k'_2)}(x)$$

where the last entity can be readily decoded using the key $k' = (k'_1, k'_2)$.

The method is best illustrated with the following example, applying the affine cipher A over $Z_n$. Since $A = M \cdot S$, and M and S are key-determined, commuting schemes, the method described above applies to the affine scheme. As seen before, it is the mapping $h(b, a) = (a, ab)$ that makes $S \cdot M$ isomorphic to $M \cdot S$. Thus, $h_1(b, a) = a$ and $h_2(a, b) = ab \pmod{n}$. The transfer key t from (a, b) to (a', b') can be derived as $$t = (h_1(b^{-1}, a^{-1} \cdot a'), h_2(b^{-1}, a^{-1} \cdot a') \cdot b')$$

$$= (a' \cdot a^{-1}, h_2(b^{-1}, a^{-1} \cdot a') + b')$$

$$= (a' \cdot a^{-1}, (a' \cdot a^{-1})b^{-1} + b')$$

$$= (a'a^{-1}, -a'a^{-1}b + b')$$

Then, to decode y using a second key (a', b'), first generate a transfer key $t = (a'a^{-1} \pmod{n}, -a'a^{-1}b + b' \pmod{n}) \triangleq (t_1, t_2)$. Then encode the message using the transfer key t according to $y' = t_1 y + t_2 \pmod{n}$.

The methods presented herein for transferring the right to decode messages are transitive. This means that two sequential transfers from Alice to Bob and then from Bob to Carol are equivalent to a direct transfer from Alice to Carol. It is important to note that, in each of the example schemes, a transfer key is also a key of the scheme.

Accordingly, two transfer keys used in the two sequential transfers can be combined to form a transfer key for the direct transfer. Take the affine scheme as an example. Let $k = (a, b)$, $k' = (a', b')$, and $k'' = (a'', b'')$ be the keys for Alice, Bob, and Carol, respectively. Then the transfer keys are $t = (a'a^{-1}, -a'a^{-1}b + b')$ from Alice to Bob, $t' = (a''a'^{-1}, -a''a'^{-1}b' + b'')$ from Bob to Carol, and $t'' = (a''a^{-1}, -a''a^{-1}b + b'')$ from Alice to Carol. It is straightforward to verify that the composition of t and t' as keys in the affine scheme yields t'':

$$t \cdot t' = (t'_1 t_1, t'_1 t_2 + t'_2)$$

$$= ((a''a'^{-1})(a'a^{-1}), (a''a'^{-1})(-a'a^{-1}b + b') + (-a''a'^{-1}b' + b''))$$

$$= (a''a^{-1}, -a''a^{-1}b + b'')$$

$$= t''$$

In other words, the composition of sequential transfers of the right to decode messages is memory-less; all the intermediate transfers will not be reflected in the overall transfer.

It should be noted also that, for the schemes X, M, and S, the transfer key generation step is equivalent to "decoding" k' with k. Thus, the computation needed in the transfer is the same as the one used in the decoding-and-re-encoding method for these schemes. One may think that the new method shows no improvement in this efficiency regard, but it has been found that the transfer key is message-independent and hence needs to be computed only once. When the number of messages m involved in the transfer increases, this feature will cut the computation required by the re-encoding method by half. Moreover, the transfer key t does not leak any useful information on the keys k and k', and a transfer performed according to the methods set forth herein will not reveal the message x. These properties make the proposed method appealing when the security of the message x and the decoding keys k and k' is an issue during a transfer.

Proxy Encryption Schemes

The below disclosure, directed to more formal proxy encryption schemes, rather than encoding schemes, is organized as follows. First, a generic proxy encryption scheme is described and characterized according to several criteria. The several following paragraphs set forth notation that will be used throughout the disclosure and recall the ElGamal public-key encryption scheme. For the purpose of comparison, this disclosure then lists two existing proxy encryption schemes and examines their properties in comparison to the present invention. Details on the two new proxy encryption schemes are then introduced, together with their security and performance analysis. Applications of these new schemes to massive document distribution and file protection are given thereafter.

The goal of proxy encryption is to delegate the decryption right from one to another in secure and efficient ways. For the discussion that follows, it is convenient to define the roles of parties that may be involved in proxy encryption. The two most important roles are those of grantor and grantee. A grantor is an original key holder of encrypted messages who wants to delegate the decryption right to someone else. A grantee is a key holder designated to perform decryption on behalf of a grantor and thus act as grantor's decryption proxy. In the motivating example in the introduction, Alice is the grantor while Bob is the grantee. Other roles may include an encryptor who is the one that originally encrypts messages for the grantor, and a facilitator who may help to perform some message processing tasks, such as transforming messages encrypted for the grantor into messages encrypted for the grantee. Certainly, it is not necessary that all these roles are played by different parties. For example, a party may play roles of the grantor and facilitator, as in the Mambo and Okamoto schemes discussed below.

With these roles in place, a proxy encryption scheme is just a description of how a grantee, possibly with some aid from a facilitator, delegates a grantee the right to decrypt messages originally generated by an encryptor for the grantee. A proxy encryption scheme may consist of four generic steps: message encryption, proxy key generation, proxy transformation and message decryption. These steps will be described in further detail below.

1. Message encryption E: The encryptor generates an encrypted message using grantor's encryption key and delivers it to the grantor.

2. Proxy generation $\pi$: To delegate the decryption right to the grantee, the grantor generates a proxy key $\pi$ as a commitment token that allows the grantee to decrypt the message encrypted for the grantor.

3. Proxy transformation $\pi$: When necessary, the facilitator performs a proxy transformation $\pi$, possibly using the proxy key $\pi$, to convert the message encrypted for the grantor to a message encrypted for the grantee.

4. Message decryption D: Upon receiving the transformed message and possibly the proxy key $\pi$, the grantee decrypts the message.

Accordingly, it should be observed that the generic scheme above covers the two straightforward solutions to proxy encryption mentioned in the introduction. The re-encryption scheme is a special case where the grantor (Alice) is also the facilitator who actually decrypts the message and then encrypts for the grantee (Bob), and the proxy $\pi$ can be considered as a collection of grantor's decryption key and grantee's encryption key, which is used only by the grantor and not by the grantee. The scheme of passing grantor's decryption key to the grantee is another special case of the generic scheme, where the proxy key is the decryption key and the proxy transformation is the identity transformation.

However, not all schemes that can be derived from the generic one above are qualified as proxy encryption schemes. Intuitively, a proxy encryption scheme has to satisfy some basic requirements, namely delegation, security, transitivity and performance, as described below.

Delegation. To ensure that, at the end of the message decryption step, the grantee is able to recover the original message correctly, the following equation must hold for any message m: $D(\Pi(E(m,e_A),\pi),D_B,\pi)=m$, where $E(m,e)$ is an encryption function of message m under encryption key e, $D(c,d,\pi)$ is a corresponding decryption function of encrypted message c under decryption key d and possibly proxy key $\pi$, $\Pi(c,\pi)$ is the proxy function that converts encrypted message c according to proxy key $\pi$, and $e_a$, $e_b$, $d_a$, and $d_b$ are the encryption and decryption keys of the grantor A and grantee B, respectively.

In addition to the correctness above, the functionality of delegation should be guaranteed. In one form, this means that, after the proxy key is issued and the proxy transformation is completed, the message decryption step should require no private information from the grantor, and it should be carried out solely by the grantee. In another form, this is equivalent to undeniability of the delegation from the grantor; that is, once the proxy key is created and proxy transformation is performed, the grantor should not be able to deny the delegation, without seeking other means such as preventing the grantee from obtaining the proxy key and receiving the transformed message. As a consequence of this functionality, the grantor's decryption key can be destroyed with grantee's decryption key and possibly the proxy key maintaining the ability to decrypt the message.

Security. In essence, a proxy encryption scheme is also an encryption scheme at least from the grantee's point of view. The introduction of proxy keys and transformations must in no way com-promise security and privacy of the encryption. Thus, it should be at least computationally hard for any unauthorized third party to recover the original message and decryption keys of the grantor and grantee from publicly available information.

Moreover, forging valid proxy keys by any untrusted party should be very hard. It must be clear, though, that generating the proxy key $\pi$ requires knowledge of at least the decryption key of the grantor; otherwise the underlying encryption system is not secure.

Transitivity. Naturally, the proxy relationship should be transitive. After the grantor delegates the decryption right, the grantee should be able to act as a new grantor to delegate the right further to another grantee, by just following the same scheme. Moreover, it should be possible for someone, say the first grantor, to delegate the right directly to a new grantee by combining all intermediate proxy keys into one proxy key and composing all consecutive proxy transformations into one transformation.

Performance. As the re-encryption scheme is an intuitive, straightforward solution to proxy encryption and it satisfies the above delegation, security and transitivity requirements, any practically useful proxy encryption scheme should have no degradation in computational performance when compared with the re-encryption scheme.

Proxy encryption schemes may vary according to their application requirements. They can be categorized according to many aspects. Obvious ones include whether they are public-key or private-key based, and whether their security measures are perfect in the information theoretical sense or rely on intractability of some computational problems. The following aspects are related to the proxy key and transformation.

Confidentiality. While secrecy of messages and decryption keys has to be enforced, secrecy of proxy keys and proxy transformations may not be a mandatory requirement. A scheme is called public if proxy keys it generates may be published without compromising its security and proxy transformations applied in untrusted environments; otherwise, the scheme is private. In a private scheme, when a proxy key is transferred from the grantor to the facilitator and grantee, care must be taken to protect the proxy key from disclosure. As a result, the proxy transformation which uses the proxy key must be performed in private as well.

Commutativity. In terms of messages, the grantee must be unconditionally trusted by the grantor, since proxy encryption by definition allows the former to decrypt on behalf of the latter. However, the trust model may be different for their private information. A proxy encryption scheme is commutative if the grantor and grantee have to trust each other with regard to their private keys; otherwise, it is non-commutative.

A commutative example is that the proxy key is such created that either one of the grantor and grantee can obtain other's decryption key from it. Whenever this is the case, the proxy encryption mechanism may be simplified to a key exchange protocol that allows the grantee to use grantor's decryption key to decrypt the encrypted messages directly.

Generality. In many cases, the grantor wants to restrict the scope of the delegated decryption right. Often intended restrictions include that the proxy key may only be used by a designated grantee, that the proxy key may only be applicable to a specific message, or that the proxy transformation may only be applied by a specific facilitator. For example, when a proxy encryption scheme is used in some applications like key escrow, it would be ideal that proxy keys are independent of messages they will apply to. But for occasional delegation such as securely specifying inheritance in someone's will, it may be highly desirable that a proxy key can only be restricted to a designated party (e.g., a grandchild), applicable to a specific message (e.g., some portion of the will) and possibly used in the proxy transformation by a particular party (an attorney).

Degenerateness. When used in the extreme situation where the grantor and grantee are a same person with a same decryption key, a proxy encryption scheme should reduce to a regular encryption scheme, without introducing any complications (such as non-trivial proxy keys and transformations, and the requirement of an extra facilitator).

As will be shown below, the Mambo and Okamoto schemes are private and non-commutative. Proxy keys in their schemes can be either message-independent or dependent but are not restricted to designated grantees. The Blaze and Strauss scheme is just opposite: it is public but commutative, and its proxy keys are message-independent but uniquely associated with designated grantees. In comparison, the schemes according to the invention set forth herein are public and non-commutative, and their proxy keys are message-dependent and restricted to designated grantees.

Proxy Encryption Using the ElGamal Cryptosystem

As the proxy encryption schemes discussed below in this disclosure will all be based on discrete logarithms in multiplicative groups, a formal setting which is common to all these encryption schemes is hereby adopted. The notation used herein recalls the ElGamal encryption scheme. Encryption schemes based on discrete logarithms are particularly advantageous because of their technical advantages over RSA-type schemes and their natural generalizations to many finite groups such as elliptic curve groups over finite fields.

As set forth above, for any natural number n, let $Z_n=\{0, 1, \ldots, n-1\}$ denote the ring of integers modulo n, and let $Z^*_n=\{m \in Z_n | \gcd(m,n)=1\}$ denote the multiplicative group of $Z_n$. Note that, when n is a prime, $Z^*_n=\{1, \ldots, n-1\}$. For a modulo n and a number a that is relatively prime to n, let $a^{-1}$ denote the multiplicative inverse of a modulo n; that is, $a^{-1}$ is the element that satisfies $aa^{-1}=1 \pmod{n}$.

An element a of $Z^*_p$ is said to be of order m if the number of its powers modulo n is m. A generator g of $Z^*_n$, if it exists, is an element of order $|Z^*_n|$ (the size of $Z^*_n$); in this case, $Z^*_n$ is a cyclic group. When n is a prime, every element of $Z^*_n$ except 1 is a generator of $Z^*_n$.

Let $Z^*_n$ be a cyclic group with a generator g. The discrete logarithm of an element x to the base g, denoted as log.sub.g x, is the unique integer a, $0 \le a \le n-1$, such that $x=g^a \pmod{n}$. The discrete logarithm problem is that, given a prime p, a generator g of $Z^*_p$, and an element $X \in Z^*_p$, find the integer a, $0 \le a \le p-2$, such that $g^a \equiv x \pmod{p}$.

A very closely related problem is the Diffie-Hellman problem: given a prime p, a generator g of $Z^*_p$, and elements $g^a \pmod{p}$ and $g^b \pmod{p}$, find $g^{ab} \pmod{p}$. The discrete-logarithm problem is at least as hard as the Diffie-Hellman problem, because any solution to the former problem can be used to solve the latter problem.

The ElGamal encryption scheme is a part of a discrete-logarithm based, public-key cryptosystem proposed by ElGamal for both encryption and digital signature. See T. ElGamal, "A public key cryptosystem and a signature scheme based on discrete logarithm," IEEE Trans. on Information Theory, Vol. 31, pp. 465-472 (1985).

The ElGamal scheme is set up by establishing two public parameters p and g, where p is a prime (typically 512 bits in length), such that p−1 has a large (typically 160 bit) prime factor q (e.g., p=2q+1) and g is a generator in $Z^*_p$. A private key for a user is set by uniformly choosing a random number $a \in Z^*_p-1$. Its related public key is calculated as $a=g^a \pmod{p}$. The user publishes a and keeps a secret.

To encrypt a message m to be sent to user A with public key a, a random number $k \in Z^*_p-1$; is uniformly chosen, and a pair of numbers (r,s), together representing the encrypted message to be sent to A, is calculated as follows: $r=g^k \pmod{p}$ and $s=ma^k \pmod{p}$.

To decrypt the message (r,s), the recipient A recovers the message m by calculating $m=s(r^a)^{-1} \pmod{p}$.

Note that the selection of the public parameters is intended to establish equation $g^{P-1} \pmod{p} \equiv 1$ (Fermat's little theorem). These parameters should be authentically known to all users. They can be chosen, say, by some trusted authority. Also, the way that private key a is chosen ensures that the inverse $a^{-1}$ of a modulo $p^{-1}$ exists and is unique.

Unlike the RSA public-key encryption scheme, the ElGamal scheme is non-deterministic, since the encrypted message also depends on the random number k. Indeed, it is similar in nature to the Diffie-Hellman key exchange protocol; the key established between the sender and receiver for encrypting and decrypting the message m is $g^{a}k \pmod{p}$ from $r=g^k \pmod{p}$ (part of the encrypted message) and $a=g^a \pmod{p}$ (the public key of A). Nevertheless, the security of the ElGamal encryption scheme relies on the intractability of the discrete logarithm problem and the Diffie-Hellman problem. To date, practice in seeking optimal algorithms for the discrete logarithm problem has not found any efficient (polynomial-time) solution. It is similar to the situation for the integer factorization problem upon which security of the RSA scheme is based. Moreover, it has also been shown that, for some primes p, solving the discrete logarithm problem is at least as hard as solving the factorization problem of a same size. This implies that for those ps, the ElGamal scheme is at least as secure as the RSA scheme.

Very recently, several proxy encryption schemes have been proposed. All these schemes follow the generic proxy encryption scheme in delegating the decryption right: the encryptor sends an encrypted message to the grantor A, who then delegates the decryption right to grantee B by creating the proxy key, and after the proxy transformation is completed the grantee B finally decrypts the message. Two representative and known proxy encryption schemes are presented below: one from Mambo and Okamoto and the other from Blaze and Strauss, both of which are variations on the ElGamal scheme. Since they have the same scheme setup as the ElGamal scheme, the setup is omitted from the presentation.

Mambo and Okamoto have proposed three proxy encryption schemes: two are based on the ElGamal scheme and the other is based on the RSA scheme. Given a message m that needs to be sent to a grantor A with public key a, the message m is encrypted by uniformly choosing a random number $k \in Z^*_p-1$ and calculating a pair of numbers (r,s) representing the encrypted message as follows: $r=g^k(\bmod\ p)$ and $s=ma^k(\bmod\ p)$.

To delegate the decryption right to a grantee B, the grantor A creates a proxy key $\pi$ by uniformly choosing a random number $a' \in Z^*_p-1$ and calculating $\pi=aa'(\bmod(p-1))$. Then, A delivers the proxy key $\pi$ to B in a secure manner (e.g., by encrypting it with B's public key) and keeps the value of a' private.

To allow B to decrypt the message, A calculates $r'=r^{a'(-1)}(\bmod\ p)$, where $a'^{-1}$ is the multiplicative inverse of a' modulo p-1. The pair (r', s) is the transformed, encrypted message to be sent to B.

Upon receiving the transformed message (r', s) and the proxy key $\pi$, B decrypts the message m by calculating $m=s(r'^\pi)^{-1}(\bmod\ p)$.

This proxy encryption scheme uses the encryption and decryption components of the ElGamal scheme, except B's private key is replaced by the proxy key $\pi$. It is correct because, when using $\pi$ to decrypt the transformed message (r', s), the following holds:

$$s((r'^\pi)^{-1})\bmod p = s(r^{aa'a^{-1}})^{-1}(\bmod\ p) = mg^{ka}(g^{ka})^{-1}(\bmod\ p) = m$$

The security of this scheme is evaluated in two aspects. The complexity for anyone, including the grantee B, to discover grantor A's private key a based on all the available information is as same as the one for solving the discrete logarithm problem. The difficulty for anyone, even with the proxy key, to impersonate A to transform the encrypted message (i.e., to generate (r', s)) is the same as the one for solving the Diffie-Hellman problem.

This scheme has several very appealing features. First, its security implies that it is hard for B to recover A's private key. In this sense, there is no need for A to trust B, and hence the scheme is non-commutative. Second, the proxy key $\pi$ generated is message-independent. B can use it to decrypt all the messages transformed by A. Third, this scheme satisfies the transitivity requirement. Upon receiving both the proxy key $\pi$ and the transformed message (r', s), the delegated user B can further delegate the proxy to another user C, by treating $\pi$ as the private key a and (r', s) as (r, s) and repeating the proxy generation and transformation. Fourth, the scheme requires less computational efforts than the re-encryption scheme.

However, implementing proxy encryption in the manner of this scheme has several shortcomings. First, the proxy key contains no information about the delegated grantee B; it is solely derived from grantor A's private key. Moreover, the message decryption performed by B does not need B's private decryption key either. Consequently, the message can be recovered by anyone that gets hold of the proxy key and encrypted message, not necessarily B. Thus, B can ask anyone to decrypt the message by directly passing the proxy information. In many cases, this is not desirable; A should be able to specify the key holder who is to act on A's behalf.

Second, the proxy key $\pi$ has to be a secret between A and B and needs to be transmitted from A to B in a secure manner: As a result of $\pi$ containing no information of B and (r', s) being possibly communicated in public, revealing $\pi$ is essentially equal to disclosing the message.

Third, the proxy transformation has to be conducted by A. The value a' used in the transformation is a secret to A and it is vital to preventing B from knowing A's decryption key a. In short, the scheme is non-commutative and message-independent, but private and unable to specify the designated grantee.

Blaze and Strauss have described another public-key proxy encryption scheme, which is similar in structure to ElGamal encryption, but with the parameters used differently and the inverse of the secret used to recover the message. Given a message m that needs to be sent to a grantor A with public key a, the message m is encrypted by uniformly choosing a random number $k \in Z^*_p-1$ and calculating a pair of numbers (r, s) representing the encrypted message as follows: $r=mg^k(\bmod\ p)$ and $s=a^k(\bmod\ p)$. To delegate the decryption right to a grantee B, the grantor A creates a proxy key $\pi$ by obtaining B's private decryption key b and computing $\pi=a^{-1}b(\bmod(p-1))$, where $a^{-1}$ is the inverse of the private key a of A modulo p-1. The proxy key $\pi$ can be made public. To use the proxy key $\pi$ to convert a message (r, s) encrypted for A to a message encrypted for B, the facilitator (not necessarily A, since the proxy key $\pi$ is public) computes $s'=s^\pi(\bmod\ p)$. The pair (r, s') represents the transformed encrypted message, which can then be transmitted to B. To decrypt the transformed message, B computes $m=r(s'^{(b(-1))})^{-1}(\bmod\ p)$, where b is B's private key and $b^{-1}$ is the inverse of b modulo p-1. The scheme is correct, since in the message decryption $s'^{b^{-1}}=g^k(\bmod\ p)$ and $m=r(g^k)^{-1}(\bmod\ p)$.

The scheme is secure in that the message m and secret keys a and b cannot be recovered from the encrypted messages and public keys. Moreover, publishing the proxy key compromises neither the message m nor the secret keys a and b. More precisely, the problem of recovering m from the public information ($\alpha$, $\beta$, r, s, $\pi$, s') is as hard as the Diffie-Hellman problem. In contrast to the previous scheme, the last security feature makes it unnecessary to keep the proxy key $\pi$ private. Thus, the grantor A can publicly send $\pi$ to whoever (facilitator) is to perform the proxy transformation, or can simply publish it. Moreover, the scheme does not require any secret from A in order to carry out the proxy transformation, and consequently it allows anyone, trusted or not, to perform the transformation and hence eliminates the necessity of A's, as well as B's, presence in the transformation.

Also unlike the previous scheme, there is no difference to the user B between decrypting a regular encrypted message and decrypting a proxy transformed message. This elegant feature allows the user B to treat all incoming encrypted messages uniformly. In fact, it is possible for an untrusted facilitator or server to perform the proxy transformation and then forward the message to the user B. In spite of these desirable features, this scheme is commutative; the involved key holders A and B must trust one another bilaterally. B can learn A's secret key a (by multiplying the proxy key by $b^{-1}$). In addition, the proxy key is also message-independent, as it is in the previous scheme, which delegates B the right to decrypt all messages encrypted for A's private key a. Accordingly, this scheme is public and message-independent but commutative.

Two proxy encryption schemes are analyzed in regard to their security, commutativity and performance. Like the private proxy scheme, they are non-commutative, and at the same time, they support public proxy keys and transformations in the fashion the commutative proxy scheme does. However, they differ from the private and commutative schemes in that they are message dependent. Moreover, their overall performance is better than the ElGamal-based re-encryption scheme. Again, these schemes share the same scheme setup of the ElGamal scheme, and they assume that a grantor A delegates the decryption right to a grantee B.

To understand how to adapt the ElGamal scheme into a proxy encryption scheme, it is helpful to examine some details of the ElGamal scheme. It should be noted that the r component of the encrypted message m is independent of the recipient A's private key a and public key a. As $s=ma^k(\bmod\ p)=mg^ka\ (\bmod\ p)$, a is only used in the s component, and a is implicitly embedded in s's exponent. Thus, it is sufficient for the proxy transformation to convert the message encrypted for A into the message encrypted for B by removing A's private key a from s and replacing it with B's private key b. In order to prevent B from obtaining A's private key a, the function to generate the proxy key must be somehow "one-way." Indeed, this can be achieved with aid of the random number k as follows: $\pi = g^{k(b-a)} \pmod p$. Consequently, the proxy transformation that completes the message conversion should look like the following: $s' = s\pi \pmod p = mg^{ka}g^{k(b-a)} \pmod p = mg^{kb} \pmod p$. It turns out that the proxy key and transformation satisfy the security requirement and provide desired being-public and non-commutativity features.

Given a message m that needs to be sent to a grantor A with public key a, the message m is encrypted by uniformly choosing a random number $k \in Z^*_{p-1}$ and calculating a pair of numbers (r, s) representing the encrypted message as follows: $r = g^k \pmod p$ and $s = ma^k \pmod p$.

To delegate the decryption right to a grantee B, grantor A creates a proxy key $\pi$ by obtaining B's authentic decryption key b and calculating $\pi = r^{b-a} \pmod p$. The message is transformed from (r, s) to (r, s') by calculating $s' = s\pi \pmod p$. The message m is then decrypted by B from (r, s') by computing $m = s'(r^b)^{-1} \pmod p$. Clearly, this scheme uses the message encryption and decryption steps of the ElGamal scheme. It is correct as the message m can be recovered from $$s'(r^b)^{-1} \pmod p = s\pi(r^b)^{-1} \pmod p = mg^{ak}g^{k(b-a)}(g^{kb})^{-1} \pmod p = m.$$

A nice feature of this scheme is that, not only do regular and proxy encrypted messages appear no different to the grantee B, but also the scheme coincides with the ElGamal scheme when A and B are the same user with the same key; in this case, the proxy value $\pi$ is equal to 1 and the proxy transformation is the identity transformation.

It is easy to see that the scheme is transitive. Upon receiving the proxy transformed message, the grantee B can act like the grantor A to further delegate the decryption right to, say, another grantee C by repeating the proxy generation step with the keys b and c in place of a and b. Also like the commutative scheme, the proxy generation step requires both A's and B's private keys in order to generate the proxy key $\pi$. As an alternative, this step can be carried out by anyone that is trusted by both A and B. As noted above, A's private key is definitely needed, as otherwise anyone can issue a proxy key to recover the message and the underlying encryption scheme is not secure. To establish and communicate B's private key b, many key-exchange protocols such as the Diffie-Hellman key exchange may be used. As shown in further detail below, in some practical applications the requirement of the key b either is not a problem or can be relaxed. But unlike the private and commutative schemes, this scheme does not make it easy for the grantee B to decrypt messages encrypted for A other than the intended one. Clearly, the proxy key $\pi$ contains a piece of information that is specific to the encrypted message m, namely, the random number k. In this sense, the proxy scheme is message-dependent. Moreover, the scheme is non-commutative in the sense that it is hard for B to discover A's private key a. This fact, together with the performance of the scheme will be established below.

Note that, in the previous scheme, the proxy transformation only changes the s component of the encrypted message. Since s is the part that actually carries the information about the message m, the scheme may not be efficient when m is a very long message. For example, the proxy key generated would be as long as the message and the effort spent in the proxy transformation would be linear with regard to the length of the entire message. This scheme tends to improve this situation. It uses the message encryption step of the commutative scheme in which the message m is shifted from s to r. Its proxy key and transformation now have no direct dependence on the message m. Given a message m that needs to be sent to a grantor A with public key a, the message m is encrypted by uniformly choosing a random number $k \in Z^*_{p}-1$ and calculating a pair of numbers (r, s) representing the encrypted message as follows: $r = mg^k \pmod p$ and $s = a^k \pmod p$.

To delegate the decryption right to a grantee B, grantor A creates a proxy key $\pi$ by obtaining B's authentic decryption key b and calculating $\pi = (s^{a^{(-1)}})^b - a \pmod p$, where $a^{-1}$ is the inverse of a modulo p−1. The message is transformed from (r, s) to (r, s') by calculating $s' = s\pi \pmod p$. The message m is then decrypted by B from (r, s') by computing $m = r(s'^{b^{(-1)}})^{-1} \pmod p$, where $b^{-1}$ is the inverse of b modulo p−1. This scheme is correct since $$r(s'^{b^{-1}})^{-1} \pmod p = r((s\pi)^{b^{-1}})^{-1} \pmod p$$
$$= r\left(\left(s\left(s^{a^{-1}}\right)^{b-a}\right)^{b^{-1}}\right)^{-1} \pmod p$$
$$= r\left((g^{kb})^{b^{-1}}\right)^{-1} \pmod p$$
$$= mg(g^k)^{-1} \pmod p$$
$$= m$$

Other properties of this scheme can be verified in the same way as the previous scheme.

Due to their similarity in nature, only the first of the two new schemes is analyzed in this section in regard to its security and non-commutativity. An almost same discussion can be carried out for the second scheme. In addition, though the first scheme (as well as the second scheme) is transitive and its security may involve more than two key holders, the analysis to be given only considers the two-key-holder case; the general case is also similar. For presentation clarity, the phrase "(mod p)" will be omitted in this subsection; its occurrence should be clear from context.

Recall that, other than the scheme parameters (p, g), the public information available from the scheme includes $a = g^a$, $\beta = g^b$, $r = g^k$, $s = mg^{ak}$, $\pi = g^{k(b-a)}$, $s' = mg^{bk}$. For the reasons set forth below, the scheme is computationally secure. It is hard to recover the message m and secret keys a and b from the public information, provided that the Diffie-Hellman and discrete-logarithm problems are hard to solve. Since the proxy key is part of the public information, this implies publishing it compromises neither the message nor the secret keys. A consequence of this is that it is also hard for anyone to forge a valid proxy key in a systematic manner. Beyond that, the scheme is shown to be non-commutative in the sense that even with B's private key, it is still hard to recover A's private key. If the proxy key is indeed generated by a third party trusted by both A and B, this fact implies that it is not necessary for B to trust A either. This is a significant improvement over the commutative scheme.

Note that the total number of operations for re-encryption using the ElGamal scheme is twice the number of operations for a single ElGamal encryption and decryption, since the message must first be encrypted, then decrypted, then re-encrypted, then re-decrypted. Moreover, the computation in the second scheme can be optimized by (i) pre-computing the inverses $a^{-1}$ and $b^{-1}$ in the scheme setup step and (ii) multiplying the two exponential components (modulo (p−1)) in the proxy generation step instead of using two exponentiations. The second set of numbers under the second scheme result from this optimization.

Applications

Public and non-commutative proxy encryption schemes provide a key mechanism for implementing a wide range of applications. Massive document distribution and file protection are two key motivations for this disclosure. These applications correspond to two typical situations for proxy encryption. The former is related to the case where the grantor is the one who encrypts the message at the first place, while the latter is to self-delegation in which the grantor and grantee are the same key holder but with different keys.

Again, note that a document refers to any digital file whose content could text, graphics, audio, video, executable or even multi-media. Usually, a document is large in size, even after compression. Because public-key algorithms tend to be very slow when compared with conventional private-key algorithms such as DES, IDEA and RC4, and private-key algorithms require establishing secret keys to begin with, the most practical approach to massive and secure distribution of documents over networks is to combine the private-key and public-key encryption mechanisms. Typically, an efficient private-key algorithm is used to encrypt the document by using a randomly generated key, called the session key, and the public key for each document recipient is used to encrypt this session key. Recipients use their private keys to recover the secret session key and then use it to decrypt the document.

Indeed, the above document distribution approach has the proxy encryption flavor; the owner encrypts the document first using a private-key scheme and then grants the decryption right, upon request, to its recipients via a public-key scheme. It turns out that, either one of the two new proxy encryption schemes can be used to combine the best features of the approach into a single, normal encryption scheme.

Take the second scheme set forth above, for example. Two observations are in order. First, the component r of the encrypted message can be generated using any private-key encryption scheme with $K=g^k \pmod p$ as the secret session key. Accordingly, the message m can be recovered in the message decryption step by its corresponding private-key decryption using the secret session key $K'=s'^{(b^{-1})} \pmod p = K$. In fact, the secret-key encryption scheme used in the scheme is $r=E_k(m)=mK \pmod p$ for encryption and $m=D_{k'}(r)=rK'^{-1} \pmod p$ for decryption. Another simple example is the encryption scheme based on bit-wise XOR ($\oplus$). In this case, the computation of r and m can be replaced by $r=E_K(m)=m \oplus k$ and $m=D_k(r)=r \oplus K$.

Certainly, more sophisticated private-key encryption schemes such as DES and triple-DES can be employed if stronger security is needed.

The second observation is that, if the grantor A is the one who encrypts the message m, then A can keep the random number k private and use B's public key $\beta=g^b \pmod p$, instead of B's private key b, to generate the proxy key: $\pi=(\beta a^{-})^k \pmod p$, where a is A's private key. This eliminates the requirement for B's private key b (or key exchange between A and B), and implies that B does not have to trust A, either.

These two observations lead to a document distribution scheme, which is based on the second proxy encryption scheme discussed above. In the scheme, a private-key encryption scheme is used to encrypt the message just once for all recipients, while a less expedient proxy-key portion is used to encrypt a small amount of information—the session key—customized once for each recipient. A beneficial feature of this scheme is that the encrypted document can be stored in a publicly accessible repository, and the proxy transformation can be performed by the document owner A, the recipient B, or the repository where the document is physically stored, depending upon the needs of real document management and distribution systems. The scheme is set up the same way as a standard ElGamal scheme. In addition, a symmetric, private-key encryption scheme is selected. Its encryption function is $m \rightarrow E_k(m)$ and decryption function is $r \rightarrow D_k(r)$, where K is some private key.

To encrypt a document m, owner A first chooses a uniformly random number $k \in Z^*_p - 1$ and calculates a session key $K=g^k \pmod p$. The encrypted document (r, s) is then calculated as follows: $r=E_K(m)$ and $s=K^a \pmod p$, where a is A's private key. A keeps the pair (s, k) private. Upon request from a recipient B for the encrypted document (r, s), A first obtains B's authentic public key $\beta$ and retrieves k from the pair (s, k). A then computes $\pi_b = \beta^k s^{-1} \pmod p$, where $s^{-1}$ is the inverse of s modulo p, as the proxy key for B. The document is then transformed by computing $s' = s\pi_b \pmod p$; the pair (r, s') represents the transformed document customized for B. To decrypt the customized document (r, s') and retrieve the original document m, B first recovers the session key by calculating $K=s'^{(b^{-1})} \pmod p$, where $b^{-1}$ is the inverse of b modulo p−1. Then the document itself is decrypted by calculating $m=D_k(r)$.

As described above, an adaptation of the present invention is also applicable to a file protection application. Usually, file protection in insecure systems such as laptops and networked hardware involves long-term encryption of files. Thus, encryption keys used for file encryption have much longer lifetimes than their communication counterparts. While a user's primary, long-term, secret key may be the fundamental representation of a network identity of the user, there is a danger that it might get compromised if it is used for many files over a long period of time. If the primary key is lost or stolen, not only are contents of the files encrypted with it disclosed, but also the user loses personal information based on the key such as credit card account, social security number, and so on. Therefore, it is often preferable to use an on-line method in which a new decryption key is derived from the primary key every time a file needs to be encrypted and gets updated on a regular basis.

With the proxy encryption schemes set forth herein, new decryption keys can be generated and constantly updated through self-delegation to keep them fresh. Once a new key is created and a corresponding proxy key generated, the old secret key can be destroyed, with the new key and proxy key maintaining the ability to decrypt the file.

A file protection scheme may also be provided which uses a smart card to store and update decryption keys. It is again based on the second proxy encryption scheme presented herein. To encrypt a file m, a processor embedded in a smart card chooses a random number $k \in Z^*_{p-1}$, and computes $r=mg^k \pmod p$ and $s=(g^k)^a \pmod p$, where a is the smart card's private key. The pair (r, s) represents the file m in encrypted form. Whenever necessary or desired, for example every few weeks or after a predetermined number of document accesses, the smart card generates another uniform random number $a' \in Z^*_p - 1$ and computes $s'=(s^{a^{(-1)}})^{a'} \pmod p$, where $a^{-1}$ is the multiplicative inverse of a modulo p−1. The encrypted file (r, s) is then replaced with (r, s'), and the decryption key a is replaced with a new decryption key a'. These steps can be repeated as many times as desired. To recover the original file m from its encrypted version (r, s), the processor on the smart card uses the latest decryption key a to compute $m=rs^{a^{(-1)}} \pmod p$. Note that the file encryption step can start with any secret key it generates, not necessarily the smart card's private key.

To keep encrypted files fresh by updating encryption data with a piece of smart-card-generated information helps to maintain single useful copies of protected files. This, in some sense, provides copy protection as well. Moreover, the non-commutativity of the scheme renders previous copies of the files useless, as the corresponding secret information stored in the smart card has been changed (and preferably destroyed).

Proxy Encryption Using the Cramer-Shoup Cryptosystem

Although the foregoing examples and algorithms all employ various adaptations of the ElGamal cryptosystem, it should be noted that other cryptosystems can also be adapted. For example, the Cramer-Shoup public-key cryptosystem is a recently proposed cryptosystem that is the first practical public-key system to be provably immune to the adaptive chosen ciphertext attack. See R. Cramer and V. Shoup, "A Practical Public Key Cryptosystem Provably Secure against Adaptive Chosen Ciphertext Attack," Proceedings of CRYPTO '98, Springer Verlag LNCS, vol. 1462, pp. 13-25 (1998). The adaptive chosen ciphertext attack assumes that the attacker can obtain decryptions of any chosen ciphertexts other than the target ciphertext. For example, if the target ciphertext for which the plaintext is wanted is c, then the attacker is assumed to have access to a "decryption oracle" which will decrypt any ciphertext except c, including for example c+1, 4c, etc. RSA and ElGamal fall easily to this kind of attack. A different, but equivalent, notion of security against active attacks is called non-malleability; however, known non-malleable systems are not practical.

A hash-free version of the Cramer-Shoup cryptosystem, the security of which is based strictly on the Diffie-Hellman decision problem for an arbitrary group is provided. Thereafter, how to delegate the right to decrypt in a Cramer-Shoup scheme will be illustrated in two different situations. The system is set up by choosing G as a group of prime order q, where q is large. The system assumes that cleartext messages are (or can be encoded as) elements of G, and ciphertext messages are elements of $G^4 = G \cdot G \cdot G \cdot G$; that is, a ciphertext message is four times as long as its corresponding plaintext message. A good example of the group G is the subgroup of order q in the multiplicative set $Z^*_p$ for some large prime $p=2q+1$. In this case, a message m from the set $\{1, \ldots, q\}$ can be "encoded" by squaring it modulo p, resulting in an element in G, and the message m can be recovered from its encoding by computing the unique square root of its encoding modulo p, in the set $\{1, \ldots, q\}$. A key is generated as follows. First, random elements $g_1, g_2 \in G$ are chosen, and random elements $x_1, x_2, y_{11}, y_{12}, y_{21}, y_{22}, y_{31}, y_{32}, z \in Z_q$ are chosen. Next, the group elements $c=g_1^{x1} g_2^{x2}$, $d_1=g_1^{y11} g_2^{y12}$, $d_2=g_1^{y21} g_2^{y22}$, $d_3=g_1^{y31} g_2^{y32}$, and $h=g_1^z$ are computed. The public key is then calculated to be $(g_1, g_2, c, d_1, d_2, d_3, h)$ and the private key is calculated to be $(x_1, x_2, y_{11}, y_{12}, y_{21}, y_{22}, y_{31}, y_{32}, z)$. Given a message $m \in G$, the encryption method begins by choosing $r \in Z_q$ at random. Then the ciphertext $(u_1, u_2, e, v)$ is calculated as follows: $u_1=g_1^r$, $u_2=g_2^r$, $e=h^r m$, and $v=c^r d_1^{a1r} d_2^{a?r} d_3^{er}$. Given the ciphertext $(u_1, u_2, e, v)$, the corresponding decryption algorithm first tests if $v=u_1^{x1+u1y11++u2y21+ey31} u_2^{x2+u1y12+u2y22+ey32}$. If not, the decryption effort is rejected. Otherwise, the message m is calculated as $m=e/u_1^z$.

The correctness of a cryptosystem can be verified by checking that the decryption of an encryption of a message yields the message. In this case, since $u_1=g_1^r$ and $u_2=g_2^r$, one has $u_1^{x1} u_2^{x2} = g_1^{rx1} g_2^{rx2} = c^r$. Likewise, $u_1^{x1+u1y11+u2y21+ey31} u_2^{x2+u1y12+u2y22+ey32} = c^r d_1^{u1} d_2^{u2'} d_3^{e'}$ and $u_1^r = h^r$. Therefore, for the valid ciphertext, the test performed in the decryption algorithm will pass.

The security of this cryptosystem relies upon the difficulty in solving the Diffie-Hellman decision problem. An algorithm that solves the Diffie-Hellman decision problem is a statistical test that can effectively distinguish the following two distributions: (a) random quadruples $(g_1, g_2, u_1, u_2) \in G^4$, and (b) random quadruples $(g_1, g_2, u_1, u_2) \in G^4$, where $g_1, g_2$ are random and $u_1=g_1^r$ and $u_2=g_2^r$ for some random $r \in Z_q$. Related to the Diffie-Hellman decision problem are the Diffie-Hellman problem (given g, $g^x$, and $g^y$, compute $g^{xy}$), and the discrete logarithm problem (given g and $g^x$, compute x). Within polynomial time, the Diffie-Hellman decision problem can be reduced to the Diffie-Hellman problem which in turn can be reduced to the discrete logarithm problem. It is this relationship between the three problems that leads to the possibility of delegating the right to decrypt for the Cramer-Shoup system.

Assume that someone wants to delegate the right to decrypt from a delegator (Alice, A) to a delegatee (Bob, B). Suppose that Alice has the public key $(g_1, g_2, c, d_1, d_2, d_3, h)$ and the private key $(x_1, x_2, y_{11}, y_{12}, y_{21}, y_{22}, y_{31}, y_{32}, z)$, and that Bob has the public key $(g'_1, g'_2, c', d'_1, d'_2, d'_3, h')$ and the private key $(x'_1, x'_2, y'_{11}, y'_{12}, y'_{21}, y'_{22}, y'_{31}, y'_{32}, z')$. Recall, that for a given plaintext message $m \in G$, the ciphertext message for delegator A is $M=(u_1, u_2, e, v)$, where $u_1=g_1^r$, $u_2=g_2^r$, $e=h^r m$, and $v=c^r d_1^{u1r} d_2^{u2r} d_3^{er}$. Similarly, if the message m is directly encrypted for the delegatee B, the ciphertext message is $M'=(u'_1, u'_2, e', v')$, where $u'_1=g'_1{}^{r'}$, $u'_2=g'_2{}^{r'}$, $e'=h'^{r'} m$, and $v'=c'^{r'} d'_1{}^{u'1r'} d'_2{}^{u'2r'} d'_3{}^{e'r'}$, where r' is also a random number from $Z_q$. Note further that $v=(cd_1^{u1} d_2^{u2} d_3^e)^r$ and $v'=(c'd'_1{}^{u'1} d'_2{}^{u'2} d'_3{}^{e'})^{r'}$.

Based on the ideas set forth above, to delegate the right to decrypt from A to B involves generating a transfer key $\pi$, using that transfer key to transform M into M'. In the following, it is assumed that the components $g'_1, g'_2$ of B's public key are identical to the components $g_1, g_2$ of A's public key (analogously to the ElGamal system parameters described above). Also, it is assumed that the random number r' is the same as r. Under these two assumptions, elements $u'_1, u'_2$ of B's ciphertext message are the same as elements $u_1, u_2$ of A's ciphertext message.

A system may be set up by choosing G as a group of prime order q, where q is large. Then, as above, key is generated as follows. First, random elements $g_1, g_2 \in G$ are chosen, and random elements $x_1, x_2, y_{11}, y_{12}, y_{21}, y_{22}, y_{31}, y_{32}, Z \in Z_q$ are chosen. Next, the group elements $c=g_1^{x1} g_2^{x2}$, $d_1=g_1^{y11} g_2^{y12}$, $d_2=g_1^{y21} g_2^{y22}$, $d_3=g_1^{y31} g_2^{y32}$, and $h=g_1^z$ are computed. The public key is then calculated to be $(g_1, g_2, c, d_1, d_2, d_3, h)$ and the private key is calculated to be $(x_1, x_2, y_{11}, y_{12}, y_{21}, y_{22}, y_{31}, y_{32}, z)$. Given a message $m \in G$, the encryption method begins by choosing $r \in Z_q$ at random. Then the ciphertext $(u_1, u_2, e, v)$ is calculated as follows: $u_1=g_1^r$, $u_2=g_2^r$, $e=h^r m$, and $v=c^r d_1^{u1r} d_2^{u1r} d_3^{er}$. If B's private key is available for generating the transfer key $\pi$, that key is obtained and then scan be calculated as follows: $\pi=(\epsilon, \theta, \delta_1, \delta_2, \delta_3)$ where $$\epsilon = e'/e = g_1^{(z'-z)r} = u_1^{z'-z}$$

$$\theta = C^r/c^r = g_1^{(x'_2-x_1)r} g_2^{(x'_2-x_x)r} = u_1^{x'_1-x_1} u_2^{x'_2-x_2}$$

$$\delta_1 = d'_1{}^r/d_1^r = u_1^{y'_{11}-y_{11}} u_2^{y'_{12}-y_{12}}$$

$$\delta_2 = d'_2{}^r/d_2^r = u_1^{y'_{21}-y_{21}} u_2^{y'_{22}-y_{22}}$$

$$\delta_1 = d'_3{}^{er}/d_3^{er} = u_1^{y'_{31}\epsilon-y_{31}} u_2^{y'_{32}\epsilon-y_{32}}$$

The ciphertext transformation is then $u'_1=u_1$, $u'_2=u_2$, $e'=e\epsilon$, and $v'=v\theta\delta_1^{u1} \delta_2^{u2} \delta_3^e$. This transforms the ciphertext $(u_1, u_2, e, v)$ into $(u_1, u_2, e', v')$. The recipient/delegatee is then able to decrypt the transformed cyphertext $(u_1, u_2, e', v')$. As above, the decryption algorithm first tests if $v'=$ $u'_1{}^{x'1+u'1y'11+u'2y'21+e'y'31u'2x'2+u'1y'12+u'2y'22+e'y'32}$. If not, the decryption effort is rejected. Otherwise, the message m is calculated as $m=e'/u'_1{}^{z'}$.

In the case where only the public key of the delegatee B can be used for delegating the right to decrypt the message from the delegator A to B, one needs to save and use the random number r used initially in encrypting the message for A. This may be a problem where the party to generate the transfer key is not A, and may not be a problem if the party is, in fact, A. In any case, if it is available, the transfer key it can be generated using B's public key as follows:

$\pi=(\epsilon,\theta,\delta_1,\delta_2,\delta_3)$ where $\epsilon=e'=e=(g_1{}^{z'}/g_1{}^z)^r=(h'/h)^r$ $\theta=e^r/e^r=(e'/e)^r$ $\delta_1=d'_1{}^r/d_1{}^r=(d'_1/d_1)^r$ $\delta_2=d'_2{}^r/d_2{}^r=(d'_2/d_2)^r$ $\delta_1=d'_3{}^{er}/d_3{}^{er}=(d'_3{}^e/d_3)^r$ The proxy transformation is then $u'_1=u_1$, $u'_2=e_2$, $e'=e\epsilon$, and $v'=v\theta\delta_2{}^{u1}\delta_2{}^{u2}\delta_3{}^e$.

It is straightforward to verify, in either case, that the delegatee B can use his own private key to decrypt the ciphertext ($u'_1$, $u'_2$, e', v') transformed by the methods set forth above. Since the mechanisms used herein on the Cramer-Shoup cryptosystem are the same as those used above on ElGamal-like cryptosystems, they are public and non-commutative, assuming the Diffie-Hellman problem and the discrete logarithm problem are difficult to solve.

Other embodiments will be apparent to those skilled in the art from consideration of the specification and practice of the invention disclosed herein. It is intended that the specification and examples be considered as exemplary only, with a true scope of the invention being indicated by the following claims.

The invention claimed is:

1. A method for communicating information which is encrypted from a first party to a second party, involving an intermediary which selectively authorizes the second party to comprehend the information, without the intermediary itself being enabled to comprehend the information, comprising the steps of:

identifying information to be communicated, the information being encrypted with an associated cryptographic comprehension function;

negotiating between the second party and the intermediary, an asymmetric delivery comprehension function of the information which is encrypted, different from the associated cryptographic comprehension function, wherein the asymmetric delivery comprehension function comprises a function of at least three asymmetric key components of at least three distinct respective asymmetric delivery comprehension functions, wherein the second party possesses an ability to decrypt the information which is encrypted with the asymmetric delivery comprehension function, and the intermediary possesses a portion of the asymmetric delivery comprehension function which does not impart an ability to decrypt the information which is encrypted;

transforming a comprehension function of the information which is encrypted to be communicated from the associated cryptographic comprehension function to the asymmetric delivery cryptographic comprehension function, said transforming comprising using the negotiated asymmetric delivery comprehension function of the at least three key asymmetric key components of the at least three distinct respective asymmetric delivery comprehension functions in an integral process which does not have as an intermediate state a decrypted representation of the information and does not itself require at any time during the transformation, knowledge sufficient for decrypting the information which is encrypted; and communicating the information which is encrypted with the asymmetric delivery cryptographic comprehension function to the second party.

2. The method according to claim 1, wherein the identified information comprises a medical record.

3. The method according to claim 1, wherein the identified information comprises at least one of a video and an audio stream.

4. The method according to claim 1, wherein at least one of the at least three asymmetric key components comprises a dynamically generated secret key.

5. The method according to claim 1, wherein the portion of the asymmetric delivery comprehension function held by the intermediary comprises at least two fewer key components than the at least three key components.

6. The method according to claim 1, wherein the intermediary performs a financial accounting of at least one of said negotiating, said transforming, and said communicating steps.

7. The method according to claim 1, wherein at least one of said negotiating, said transforming, and said communicating steps creates a cryptographic audit trail.

8. The method according to claim 1, wherein said negotiating step comprises a cryptographic micropayment transaction.

9. The method according to claim 1, wherein a cryptographic value associated with a portable self-authenticating cryptographic micropayment data structure is intrinsically embedded in said asymmetric delivery comprehension function, and a decryption of the information which is encrypted with the asymmetric delivery comprehension function consumes a value of the portable self-authenticating cryptographic micropayment data structure.

10. A system for communicating information which is encrypted from a first party to a second party, involving an intermediary that selectively authorizes the second party to comprehend the information, without the intermediary itself being enabled to comprehend the information, comprising:

a communication port which receives information which is encrypted to be communicated or an identification thereof, the information being encrypted with an associated cryptographic comprehension function;

at least one automated processor which conducts a negotiation between the second party and the intermediary through the communication port of an asymmetric delivery comprehension function of the information which is encrypted, different from the associated cryptographic comprehension function, wherein the asymmetric delivery comprehension function comprises a function of at least three asymmetric key components of at least three distinct respective asymmetric delivery comprehension functions, wherein the second party possesses an ability to decrypt the information which is encrypted with the asymmetric delivery comprehension function, and the intermediary possesses a portion of the asymmetric delivery comprehension function which does not impart an ability to decrypt the information which is encrypted;

the at least one automated processor further transforms a comprehension function of the information which is encrypted to be communicated from the associated cryptographic comprehension function to the asymmetric delivery cryptographic comprehension function, comprising using the negotiated asymmetric delivery comprehension function of the at least three key asymmetric key components of the at least three distinct respective asymmetric delivery comprehension functions in an integral process which does not have as an intermediate state a decrypted representation of the information and does not itself require at any time during the transformation, knowledge sufficient for decrypting the information which is encrypted; and said communication port communicating the information which is encrypted with the asymmetric delivery cryptographic comprehension function to the second party.

11. The system according to claim 10, wherein the information comprises a medical record.

12. The system according to claim 10, wherein the information comprises at least one of a video and an audio stream.

13. The system according to claim 10, wherein at least one of the at least three asymmetric key components comprises a dynamically generated secret key.

14. The system according to claim 10, wherein the portion of the asymmetric delivery comprehension function held by the intermediary comprises at least two fewer key components than the at least three key components.

15. The system according to claim 10, wherein the intermediary performs a financial accounting of at least one of said negotiating, said transforming, and said communicating steps.

16. The system according to claim 10, wherein the processor creates a cryptographic audit trail.

17. The system according to claim 10, wherein said processor performs a cryptographic micropayment transaction.

18. The system according to claim 10, wherein a cryptographic value associated with a portable self-authenticating cryptographic micropayment data structure is intrinsically embedded in said asymmetric delivery comprehension function, and a decryption of the information which is encrypted with the asymmetric delivery comprehension function consumes a value of the portable self-authenticating cryptographic micropayment data structure.

19. A non-transitory computer readable storage medium, having stored therein instructions for communicating information which is encrypted from a first party to a second party, involving an intermediary which selectively authorizes the second party to comprehend the information, without the intermediary itself being enabled to comprehend the information, which, when executed, cause the processor to perform a method comprising the steps of:

receiving communicated information which is encrypted, the information being encrypted with an associated cryptographic comprehension function;

negotiating between the second party and the intermediary, an asymmetric delivery comprehension function of the information which is encrypted, different from the associated cryptographic comprehension function, wherein the asymmetric delivery comprehension function comprises a function of at least three asymmetric key components of at least three distinct respective asymmetric delivery comprehension functions, wherein the second party possesses an ability to decrypt the information which is encrypted with the asymmetric delivery comprehension function, and the intermediary possesses a portion of the asymmetric delivery comprehension function which does not impart an ability to decrypt the information which is encrypted;

transforming a comprehension function of the information which is encrypted to be communicated from the associated cryptographic comprehension function to the asymmetric delivery cryptographic comprehension function, said transforming comprising using the negotiated asymmetric delivery comprehension function of the at least three key asymmetric key components of the at least three distinct respective asymmetric delivery comprehension functions in an integral process which does not have as an intermediate state during the transformation a decrypted representation of the information and does not itself require at any time during the transformation, knowledge sufficient for decrypting the information which is encrypted; and communicating the information which is encrypted with the asymmetric delivery cryptographic comprehension function to the second party.

20. The computer readable storage medium according to claim 19, wherein said negotiating comprises receiving, from the second party, a representation of a composite function of a persistent data structure and a dynamic data structure, wherein the dynamic data structure at least obscures the persistent data structure, and at least one of the at least three asymmetric key components comprises a dynamically generated secret key.

* * * * *